US012602108B2

(12) United States Patent
Lutter et al.

(10) Patent No.: US 12,602,108 B2
(45) Date of Patent: Apr. 14, 2026

(54) SYSTEMS AND METHODS OF UPDATING A MANNER OF DISPLAY OF THREE-DIMENSIONAL OBJECTS

(71) Applicant: Apple Inc., Cupertino, CA (US)

(72) Inventors: Gregory Lutter, Boulder Creek, CA (US); Peter Burgner, Venice, CA (US); Manuel C. Clement, Felton, CA (US); In Young Yang, Kirkland, WA (US); Thomas G. Salter, San Francisco, CA (US); Alesha Unpingco, Milpitas, CA (US); Lee Sparks, Lake Forest, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 18/527,007

(22) Filed: Dec. 1, 2023

(65) Prior Publication Data

US 2024/0192773 A1 Jun. 13, 2024

Related U.S. Application Data

(60) Provisional application No. 63/386,871, filed on Dec. 9, 2022.

(51) Int. Cl.
*G06F 3/01* (2006.01)
*G06F 3/04815* (2022.01)
(Continued)

(52) U.S. Cl.
CPC .............. *G06F 3/013* (2013.01); *G06F 3/011* (2013.01); *G06F 3/017* (2013.01);
(Continued)

(58) Field of Classification Search
CPC .......... G06F 3/011; G06F 3/013; G06F 3/017; G06F 3/04815; G06F 3/0484; G06F 3/04842
See application file for complete search history.

(56) References Cited

U.S. PATENT DOCUMENTS 10,289,207 B1 5/2019 Sainty
10,901,505 B1 1/2021 Haine et al.
(Continued)

OTHER PUBLICATIONS

"How can I get a 3d object to always face player/camera?", Unreal Engine Forums, Epic Games, Inc., May 2014 [online]. Retrieved from <https://forums.unrealengine.com/t/how-can-i-get-a-3d-object-to-always-face-player-camera/282682>, [retrieved on Mar. 31, 2025], 6 pages.

(Continued)

*Primary Examiner* — Adam J Snyder
(74) *Attorney, Agent, or Firm* — Kubota & Basol LLP

(57) ABSTRACT

Some examples of the disclosure are directed to systems and methods for minimizing display of an object from a maximized state to a minimized state in a three-dimensional environment. In some examples, an electronic device presents a computer-generated environment that includes a virtual object displayed in a maximized state in the three-dimensional environment. While displaying the three-dimensional environment, the electronic device detects that a first event has occurred. In response to detecting that the first event has occurred, in accordance with a determination that the first event satisfies one or more criteria, the electronic device displays the virtual object in a minimized state in the three-dimensional environment from a viewpoint of a user of the electronic device. In accordance with a determination that the first event does not satisfy the one or more criteria, the electronic device maintains display of the virtual object in the maximized state from the viewpoint.

27 Claims, 19 Drawing Sheets

(51) Int. Cl.
G06F 3/0484 (2022.01)
G06F 3/04842 (2022.01)

(52) U.S. Cl.
CPC ........ *G06F 3/04815* (2013.01); *G06F 3/0484*
(2013.01); *G06F 3/04842* (2013.01)

(56) References Cited

U.S. PATENT DOCUMENTS

| | | | |
|---|---|---|---|
| 10,993,612 B1 | 5/2021 | Abou Shousha et al. | |
| 11,094,106 B2 | 8/2021 | Tamaoki et al. | |
| 11,651,563 B1 | 5/2023 | Arsan et al. | |
| 2013/0241925 A1 | 9/2013 | Kawana et al. | |
| 2013/0336629 A1* | 12/2013 | Mulholland ............. | H04N 9/87 |
| | | | 386/230 |
| 2014/0267419 A1* | 9/2014 | Ballard ................... | G06T 11/00 |
| | | | 345/633 |
| 2014/0347390 A1* | 11/2014 | Poulos .................... | G06F 3/011 |
| | | | 345/633 |
| 2016/0026242 A1* | 1/2016 | Burns ..................... | G06F 3/011 |
| | | | 345/633 |
| 2017/0046881 A1 | 2/2017 | Kuribara | |
| 2017/0052595 A1* | 2/2017 | Poulos .................... | G06F 3/013 |
| 2017/0329480 A1 | 11/2017 | Ishikawa et al. | |
| 2018/0143693 A1* | 5/2018 | Calabrese .............. | G06F 3/011 |
| 2019/0088020 A1 | 3/2019 | Fukazawa et al. | |
| 2019/0158818 A1 | 5/2019 | Ho et al. | |
| 2019/0244416 A1* | 8/2019 | Tamaoki ................ | G09G 5/377 |

| | | | |
|---|---|---|---|
| 2020/0051304 A1 | 2/2020 | Choi et al. | |
| 2020/0218072 A1 | 7/2020 | Inatani et al. | |
| 2020/0233487 A1* | 7/2020 | Grzesiak ................. | G06F 3/011 |
| 2020/0286299 A1 | 9/2020 | Wang et al. | |
| 2020/0365117 A1 | 11/2020 | Dumas et al. | |
| 2021/0239988 A1 | 8/2021 | Kobayashi | |
| 2022/0139041 A1 | 5/2022 | Li et al. | |
| 2022/0291744 A1 | 9/2022 | Sugihara et al. | |
| 2023/0005098 A1 | 1/2023 | Aoki et al. | |
| 2023/0236674 A1 | 7/2023 | Morikawa et al. | |
| 2023/0343028 A1 | 10/2023 | Nair et al. | |
| 2024/0192772 A1 | 6/2024 | Lutter et al. | |
| 2024/0193892 A1 | 6/2024 | Lutter et al. | |
| 2024/0212268 A1 | 6/2024 | Meno | |

OTHER PUBLICATIONS

"Rotate object to look at camera using Realitykit Look(at) is broken", Apple Developer Forums, Apple Inc., Aug. 2020 [online]. Retrieved from <https://developer.apple.com/forums/thread/656611>, [retrieved on Mar. 10, 2025], 3 pages.

Non-Final Office Action received for U.S. Appl. No. 18/523,024, mailed on Jul. 2, 2025, 14 pages.

Non-Final Office Action received for U.S. Appl. No. 18/522,953, mailed on Apr. 2, 2025, 33 pages.

Final Office Action received for U.S. Appl. No. 18/522,953, mailed on Jul. 16, 2025, 37 pages.

* cited by examiner

401

409'    450    4721    404    408

412

407C'

406'

407A'    407B'

Viewpoint
418

451    Time 1    Time 2
452-1    452-2

401

409'    450

406'

407A'    407B'    408    472J    404

Viewpoint
418

451

Time 1    Time 2
452-1    452-2

401

409'

450

472K

404

412

408

407B'

406'

407A'

Viewpoint
418

451

Time 1
452-1

Time 2
452-2

500

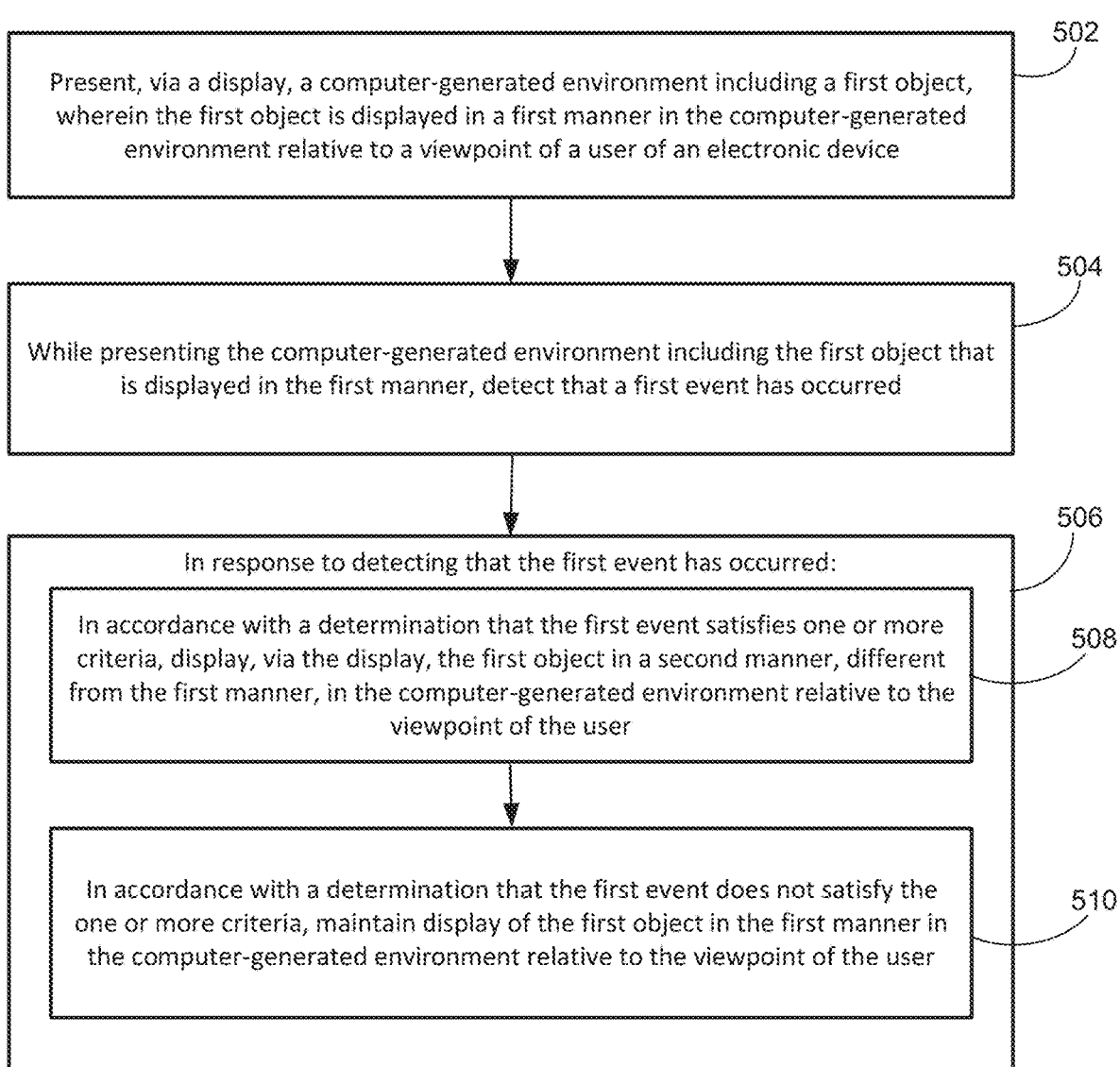

Present, via a display, a computer-generated environment including a first object, wherein the first object is displayed in a first manner in the computer-generated environment relative to a viewpoint of a user of an electronic device — 502

While presenting the computer-generated environment including the first object that is displayed in the first manner, detect that a first event has occurred — 504

In response to detecting that the first event has occurred: — 506

In accordance with a determination that the first event satisfies one or more criteria, display, via the display, the first object in a second manner, different from the first manner, in the computer-generated environment relative to the viewpoint of the user — 508

In accordance with a determination that the first event does not satisfy the one or more criteria, maintain display of the first object in the first manner in the computer-generated environment relative to the viewpoint of the user — 510

FIG. 5

SYSTEMS AND METHODS OF UPDATING A MANNER OF DISPLAY OF THREE-DIMENSIONAL OBJECTS

CROSS-REFERENCE TO RELATED APPLICATIONS

This application claims the benefit of U.S. Provisional Application No. 63/386,871, filed Dec. 9, 2022, the entire disclosure of which is herein incorporated by reference for all purposes.

FIELD OF THE DISCLOSURE

This relates generally to systems and methods of minimizing and maximizing display of three-dimensional objects in a three-dimensional environment.

BACKGROUND OF THE DISCLOSURE

Some computer graphical environments provide two-dimensional and/or three-dimensional environments where at least some objects displayed for a user's viewing are virtual and generated by a computer. In some examples, the objects are displayed in the three-dimensional environments with particular orientations (e.g., relative to a viewpoint of a user of the computer). In some examples, an object moves in the three-dimensional environment based on a movement of the viewpoint of the user (e.g., movement of the user's head and/or torso). In some examples, an undesired or unintended view of the object is presented to the user in the three-dimensional environment after the movement of the viewpoint of the user based on the particular orientation in which the object is displayed in the three-dimensional environment.

SUMMARY OF THE DISCLOSURE

Some examples of the disclosure are directed to systems and methods for minimizing display of an object from tilt locked, head locked, or world orientation in a maximized state to head locked orientation in a minimized state in a three-dimensional environment. In some examples, an electronic device presents a three-dimensional environment that includes a virtual object displayed in a maximized state and in a tilt locked, head locked, or world locked orientation in the three-dimensional environment. In some examples, while displaying the virtual object in the three-dimensional environment, the electronic device detects that a first event has occurred. In some examples, in response to detecting that the first event has occurred, in accordance with a determination that the first event satisfies one or more criteria, the electronic device displays the virtual object in a minimized state and in a head locked orientation in the three-dimensional environment from a viewpoint of a user of the electronic device. In some examples, in accordance with a determination that the first event does not satisfy the one or more criteria, the electronic device maintains display of the virtual object in the maximized state and in the tilt locked, head locked, or world locked orientation in the three-dimensional environment from the viewpoint of the user.

In some examples, detecting the first event at the electronic device includes detecting movement of the viewpoint of the user relative to the three-dimensional environment. In some examples, detecting the first event at the electronic device includes receiving a selection of a respective selectable option that is displayed with the virtual object in the three-dimensional environment. In some examples, detecting the first event at the electronic device includes detecting movement of a gaze of the user in the three-dimensional environment. In some examples, detecting the first event at the electronic device includes detecting initiation of an elapsing of a timer that is associated with the display of the virtual object in the maximized state in the three-dimensional environment.

In some examples, the satisfaction of the one or more criteria is based on the first event that is detected at the electronic device. In some examples, if the first event includes movement of the viewpoint of the user relative to the three-dimensional environment, the one or more criteria are satisfied if the movement of the viewpoint exceeds a threshold movement. In some examples, if the first event includes a selection of a respective selectable option that is displayed with the virtual object in the three-dimensional environment, the one or more criteria are satisfied if the respective selectable option is a first option in the three-dimensional environment. In some examples, if the first event includes movement of the gaze of the user in the three-dimensional environment, the one or more criteria are satisfied if the gaze is directed toward a physical object (or another virtual object) in the three-dimensional environment. In some examples, if the first event includes initiation of an elapsing of the timer that is associated with the display of the virtual object in the maximized state in the three-dimensional environment, the one or more criteria are satisfied if the countdown reaches an end of the timer (e.g., before detecting user input).

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 5 illustrates a flow diagram illustrating an example process for minimizing display of an object from tilt locked or world orientation to head locked orientation in a three-dimensional environment according to some examples of the disclosure.

DETAILED DESCRIPTION

Figure 1:
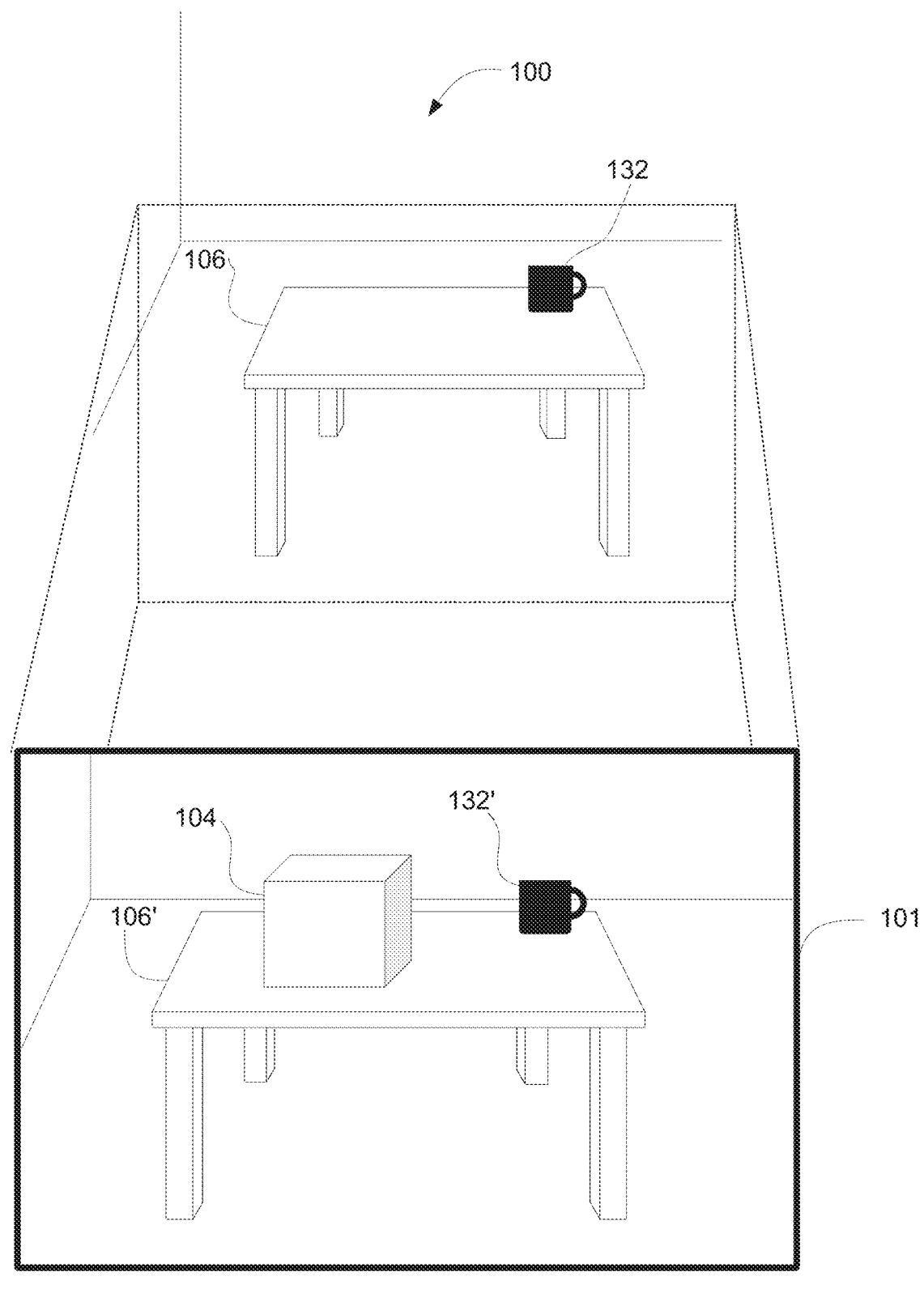
FIG. 1 illustrates an electronic device presenting an extended reality environment according to some examples of the disclosure.

Some examples of the disclosure are directed to systems and methods for minimizing (e.g., reducing in size) display of an object from tilt locked, head locked, or world orientation in a maximizes state to head locked orientation in a minimized state in a three-dimensional environment. In some examples, an electronic device presents a three-dimensional environment that includes a virtual object displayed in a maximized state (e.g., at a larger size) and in a tilt locked, head locked, or world locked orientation in the three-dimensional environment. In some examples, while displaying the virtual object in the three-dimensional environment, the electronic device detects that a first event has occurred. In some examples, in response to detecting that the first event has occurred, in accordance with a determination that the first event satisfies one or more criteria, the electronic device displays the virtual object in a minimized state and in a head locked orientation in the three-dimensional environment from a viewpoint of a user of the electronic device. In some examples, in accordance with a determination that the first event does not satisfy the one or more criteria, the electronic device maintains display of the virtual object in the maximized state and in the tilt locked, head locked, or world locked orientation in the three-dimensional environment from the viewpoint of the user.

In some examples, detecting the first event at the electronic device includes detecting movement of the viewpoint of the user relative to the three-dimensional environment. In some examples, detecting the first event at the electronic device includes receiving a selection of a respective selectable option that is displayed with the virtual object in the three-dimensional environment. In some examples, detecting the first event at the electronic device includes detecting movement of a gaze of the user in the three-dimensional environment. In some examples, detecting the first event at the electronic device includes detecting initiation of an elapsing of a timer that is associated with the display of the virtual object in the maximized state in the three-dimensional environment.

In some examples, the satisfaction of the one or more criteria is based on the first event that is detected at the electronic device. In some examples, if the first event includes movement of the viewpoint of the user relative to the three-dimensional environment, the one or more criteria are satisfied if the movement of the viewpoint exceeds a threshold movement. In some examples, if the first event includes a selection of a respective selectable option that is displayed with the virtual object in the three-dimensional environment, the one or more criteria are satisfied if the respective selectable option is a first option in the three-dimensional environment. In some examples, if the first event includes movement of the gaze of the user in the three-dimensional environment, the one or more criteria are satisfied if the gaze is directed toward a physical object (or another virtual object) in the three-dimensional environment. In some examples, if the first event includes initiation of an elapsing of the timer that is associated with the display of the virtual object in the maximized state in the three-dimensional environment, the one or more criteria are satisfied if the countdown reaches an end of the timer (e.g., before detecting user input).

In some examples, minimizing and maximizing display of a three-dimensional object in a three-dimensional environment may include interaction with one or more user interface objects in the three-dimensional environment. For example, displaying a virtual object (e.g., augmented reality content) in a minimized state and/or displaying the virtual object in a maximized state in the three-dimensional environment can include interaction with one or more virtual options/affordances displayed in the three-dimensional environment. In some examples, a user's gaze may be tracked by the electronic device as an input for identifying one or more virtual options/affordances targeted for selection when minimizing and maximizing display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In some examples, a three-dimensional object is displayed in a computer-generated three-dimensional environment with a particular orientation that controls one or more behaviors of the three-dimensional object (e.g., how the three-dimensional object is positioned within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object). In some examples, a three-dimensional object can be displayed in the three-dimensional environment in a world locked orientation, a body locked orientation, a tilt locked orientation, or a head locked orientation, as described below.

As used herein, an object that is displayed in a body locked orientation in a three-dimensional environment has a distance and orientation offset relative to a portion of the user's body (e.g., the user's torso). For example, if the user rotates their torso (irrespective of any head rotation) in the yaw direction, the body locked object would follow the torso rotation and be repositioned within the three-dimensional environment such that it is the same distance and orientation offset relative to the user's torso as before the torso rotation. Alternatively, in some examples, body locked object has a fixed distance from the user without the orientation of the content being referenced to any portion of the user's body. For example, the body locked object would not reposition itself in accordance with the torso rotation in the yaw direction (e.g., the body locked object would remain the same distance offset relative to the user's torso but would not be repositioned to have the same orientation offset relative to the user's torso). Additionally or alternatively, in some examples, the body locked object may be configured to always remain gravity or horizon (e.g., normal to gravity) aligned, such that head and/or body changes in the roll direction would not cause the body locked object to move within the three-dimensional environment. Rather, translational movement in either configuration would cause the body locked object to be repositioned within the three-dimensional environment to maintain the distance offset.

As used herein, an object that is displayed in a head locked orientation in a three-dimensional environment has a distance and orientation offset relative to the user's head. In some examples, a head locked object moves within the three-dimensional environment as the user's head moves (as the viewpoint of the user changes). For example, if the user rotates their head (e.g., clockwise or counterclockwise) in the yaw direction, the head locked object would follow the head rotation and be repositioned within the three-dimensional environment such that it is the same distance and orientation offset relative to the user's head as before the head rotation.

As used herein, an object that is displayed in a world locked orientation in a three-dimensional environment does not have a distance or orientation offset relative to the user. For example, a world locked object remains displayed at the same location in the three-dimensional environment and with the same orientation irrespective of any movement of the user's head and/or torso (e.g., in the yaw, roll, and/or pitch directions).

As used herein, an object that is displayed in a tilt locked orientation (referred to herein as a tilt locked object) in a three-dimensional environment has a distance offset relative to the user, such as a portion of the user's body (e.g., the user's torso) or the user's head. In some examples, a tilt locked object is displayed at a fixed orientation relative to the three-dimensional environment. In some examples, a tilt locked object moves according to a polar (e.g., spherical) coordinate system centered at a pole through the user (e.g., the user's head). For example, the tilt locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt locked object would follow the head tilt and move radially along a sphere, such that the tilt locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt locked object is not repositioned within the three-dimensional environment.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 132 (illustrated in the field of view of electronic device 101). In some examples, in response to a trigger, the electronic device 101 may be configured to display a virtual object 104 (e.g., two-dimensional virtual content) in the computer-generated environment (e.g., represented by a cube illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 132' of real-world coffee mug 132 displayed via electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 104 is optionally configured to be interactive and responsive to user input, such that a user may virtually touch, tap, move, rotate, or otherwise interact with, the virtual object 104. In some examples, the virtual object 104 may be displayed in a three-dimensional computer-generated environment with a particular orientation. For example, the virtual object 104 may be displayed in a tilt locked orientation, a body locked orientation, a head locked orientation, or a world locked orientation in the three-dimensional environment. In some such examples, as described in more detail below, while the virtual object 104 is displayed in the three-dimensional environment, the electronic device selectively moves the virtual object 104 in response to user input (e.g., direct input or indirect input) according to the particular orientation in which the virtual object is displayed. For example, the electronic device selectively moves the virtual object 104 in response to movement of a viewpoint of the user depending on whether the virtual object 104 is body locked, head locked, tilt locked, or world locked. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
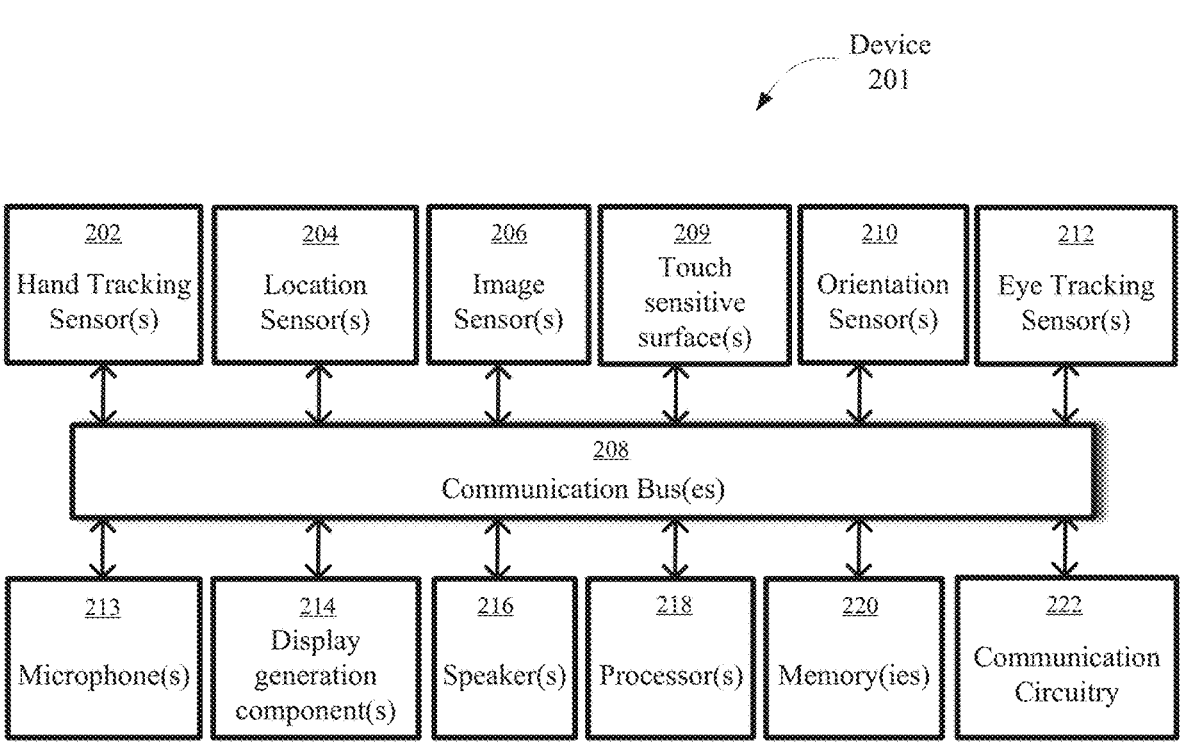
FIG. 2 illustrates a block diagram of an exemplary architecture for a device according to some examples of the disclosure.

FIG. 2 illustrates a block diagram of an exemplary architecture for a device 201 according to some examples of the disclosure. In some examples, device 201 includes one or more electronic devices. For example, the electronic device 201 may be a portable device, such as a mobile phone, smart phone, a tablet computer, a laptop computer, an auxiliary device in communication with another device, a head-mounted display, etc., respectively.

As illustrated in FIG. 2, the electronic device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Electronic device 201 is not limited to the components and configuration of FIG. 2, but can include fewer, other, or additional components in multiple configurations. In some examples, device 201 can be implemented between two electronic devices (e.g., as a system). A person or persons using electronic device 201, is optionally referred to herein as a user or users of the device.

Attention is now directed towards interactions with one or more virtual objects that are displayed in a three-dimensional environment presented at an electronic device (e.g., corresponding to electronic device 201) in one or more orientations. As discussed below, the one or more virtual objects may be displayed in the three-dimensional environment in a body locked orientation, a tilt locked orientation, a head locked orientation, and/or a world locked orientation. In some examples, the electronic device selectively moves the one or more virtual objects in the three-dimensional environment in response to detecting movement of a viewpoint of a user of the electronic device depending on the orientation in which the one or more virtual objects are displayed in the three-dimensional environment. As described below, movement of the viewpoint of the user optionally causes the display generation component (e.g., display generation component(s) 214) to move within the physical environment surrounding the electronic device, which causes the portion of the physical environment and/or the three-dimensional environment displayed via the display generation component to be updated in accordance with the movement of the viewpoint.

FIGS. 3A-3E illustrate example interactions involving tilt locked and world locked objects in a three-dimensional environment according to some examples of the disclosure. In some examples, electronic device 301 may present a three-dimensional environment 350. The electronic device 301 may be similar to device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3E, a user is optionally wearing the electronic device 301, such that the three-dimensional environment 350 can be defined by X, Y and Z axes as viewed from a perspective of the electronic device (e.g., a viewpoint associated with the user of the electronic devices 301). Accordingly, as used herein, the electronic device 301 is configured to be movable with six degrees of freedom based on the movement of the user (e.g., the head of the user), such that the electronic device 301 (and thus the viewpoint of the user) may be moved in the roll direction, the pitch direction, and/or the yaw direction.

Figure 3A:
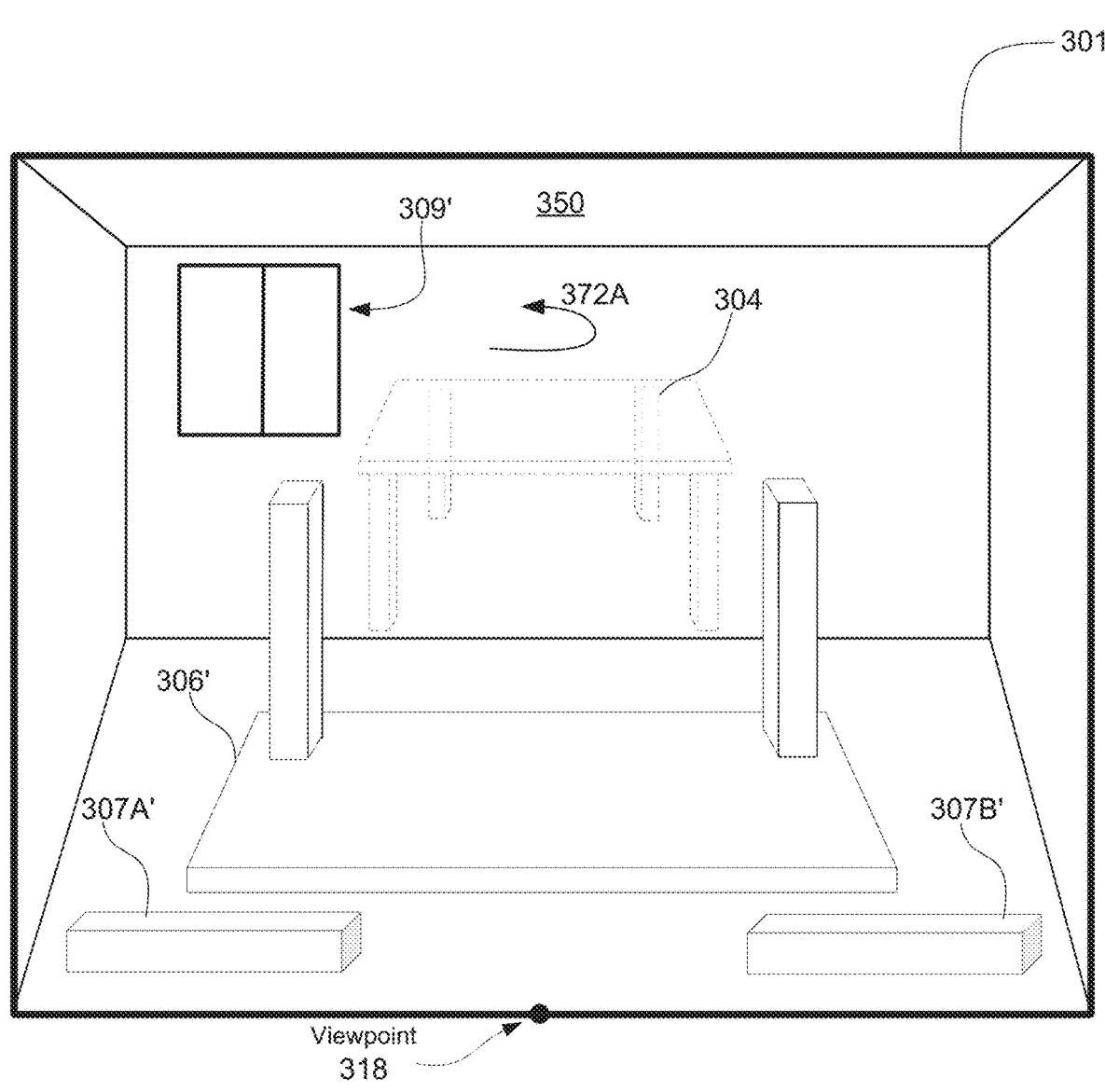
FIGS. 3A-3E illustrate example interactions involving tilt locked and world locked objects in a three-dimensional environment according to some examples of the disclosure.

As shown in FIG. 3A, the electronic device 301 may be positioned in a physical environment that includes a table 306 (e.g., corresponding to real-world table 106 in FIG. 1) and a window 309. Thus, the three-dimensional environment 350 presented using the electronic device 301 optionally includes captured portions of the physical environment surrounding the electronic device 301, such as a representation of the table 306' and a representation of the window 309'. As discussed in more detail below, the representation of the table 306' is displayed in a (e.g., partially) disassembled state, such that a representation of a first leg 307A' and a representation of a second leg 307B' are unattached from a bottom surface of the tabletop of the representation of the table 306', as shown in FIG. 3A. Additionally, as shown in FIG. 3A, the three-dimensional environment 350 may include representations of the floor, ceiling, and walls of the room in which the electronic device 301 is located. In some examples, the representations can include portions of the physical environment viewed through a transparent or translucent display of electronic device 301.

In some examples, the three-dimensional environment 350 may include one or more virtual objects. For example, as shown in FIG. 3A, the electronic device 301 is displaying a virtual object 304 (e.g., a virtual table). In some examples, the virtual object 304 is a three-dimensional representation (e.g., rendering, such as a model, scan, point cloud representation, etc.) of the table 306 in the physical environment surrounding the electronic device 301. For example, as shown in FIG. 3A, the virtual object 304 is a virtual rendering of the table 306 that is visible in the field of view of the user (e.g., corresponding to the representation of the table 306') in the three-dimensional environment 350. In some examples, the virtual object 304 may be associated with an application running on the electronic device 301. For example, as described in more detail with reference to FIG. 3B, the virtual object 304 may be associated with a furniture assembly application that provides visual cues (e.g., step-by-step instructions, animations, video clips/images, etc.) for assembling the table 306 in the physical environment surrounding the electronic device 301.

In some examples, as mentioned above, the one or more virtual objects may be displayed in the three-dimensional environment 350 with respective orientations that (e.g., initially) are automatically selected by the electronic device 301. For example, in FIG. 3A, the orientation of the virtual object 304 is selected by the electronic device 301 based on object type (e.g., a three-dimensional object vs. a two-dimensional object) and/or based on object data (e.g., commands) received by its respective application when the object is first displayed in the three-dimensional environment 350. In the example of FIG. 3A, the virtual object 304 may be displayed in a tilt locked (or head locked) orientation in the three-dimensional environment 350. For example, as discussed herein, the virtual object 304 is displayed relative to a predefined portion of a body of the user (e.g., the user's torso) in the three-dimensional environment 350. In some examples, because the virtual object 304 is tilt locked in the three-dimensional environment 350, the electronic device 301 displays the virtual object 304 at a center of the field of view of the display generation component of the electronic device 301 relative to the viewpoint of the user of the electronic device 301, as shown in FIG. 3A.

In some examples, as shown in FIG. 3A, the electronic device 301 rotates the virtual object 304 while the virtual object 304 is displayed in the three-dimensional environment 350. For example, as shown in FIG. 3A, the electronic device 301 rotates the virtual object 304, as represented by arrow 372A, about a vertical axis through the virtual object 304 (e.g., in the yaw direction) while the virtual object 304 is displayed in the three-dimensional environment 350. In some examples, the electronic device 301 is rotating the virtual object 304 in the three-dimensional environment 350 in accordance with object data received from the application associated with the virtual object 304, and not because the virtual object 304 is displayed tilt locked in the three-dimensional environment 350.

In some examples, while the three-dimensional environment 350 is displayed at the electronic device 301, a viewpoint 318 of the three-dimensional environment 350 and/or a location of the viewpoint of the user optionally changes in accordance with movement/rotation of the electronic device 301 (e.g., by the users of the electronic devices 301). For example, while the three-dimensional environment 350 is displayed, if the electronic device 301 is moved closer toward the representation of the table 306' and/or the representation of the window 309' (e.g., because the user of the electronic device 301 moved forward in the physical environment surrounding the electronic device 301), the viewpoint 318 of the user of the electronic device 301 would change accordingly, such that the representation of the table 306' and the representation of the window 309' appear larger in the field of view of three-dimensional environment 350. Similarly, if the electronic device 301 moves rightward in the physical environment (e.g., because the user of the electronic device 301 moved rightward in the physical environment surrounding the electronic device 301), the viewpoint 318 of the user of the electronic device 301 would change accordingly, such that the representation of the table 306' and the representation of the window 309' appear farther to the left in the field of view of the three-dimensional environment 350 relative to the viewpoint 318 of the user.

In some examples, when the viewpoint 318 of the user moves in the pitch direction relative to the three-dimensional environment 350, tilt locked (and/or head locked) objects move in the three-dimensional environment 350 in accordance with the movement of the viewpoint 318. For example, because an object that is tilt locked is displayed with a fixed distance and/or orientation offset relative to a predefined portion of the user's body (e.g., the user's torso or head), the tilt locked object is moved in the three-dimensional environment 350 to remain at the fixed distance and/or orientation offset relative to the predefined portion of the user's body at the new viewpoint of the user, as discussed in more detail below.

In some examples, the virtual object 304 may alternatively be displayed in a world locked orientation in the three-dimensional environment 350. For example, as described herein, the virtual object 304 may be displayed relative to the three-dimensional environment 350, such that the virtual object 304 is displayed at a fixed location in the three-dimensional environment 350 from the viewpoint 318 of the user. In some examples, when the viewpoint 318 of the user moves relative to the three-dimensional environment 350 (e.g., in any direction of movement, such as translation, pitch, roll, and yaw), world locked objects do not move in the three-dimensional environment 350 in accordance with the movement of the viewpoint 318. For example, because an object that is world locked is displayed at a fixed location in the three-dimensional environment 350, the world locked object remains displayed at the fixed location irrespective of the movement of the viewpoint 318 of the user, as discussed in more detail below.

Figure 3B:
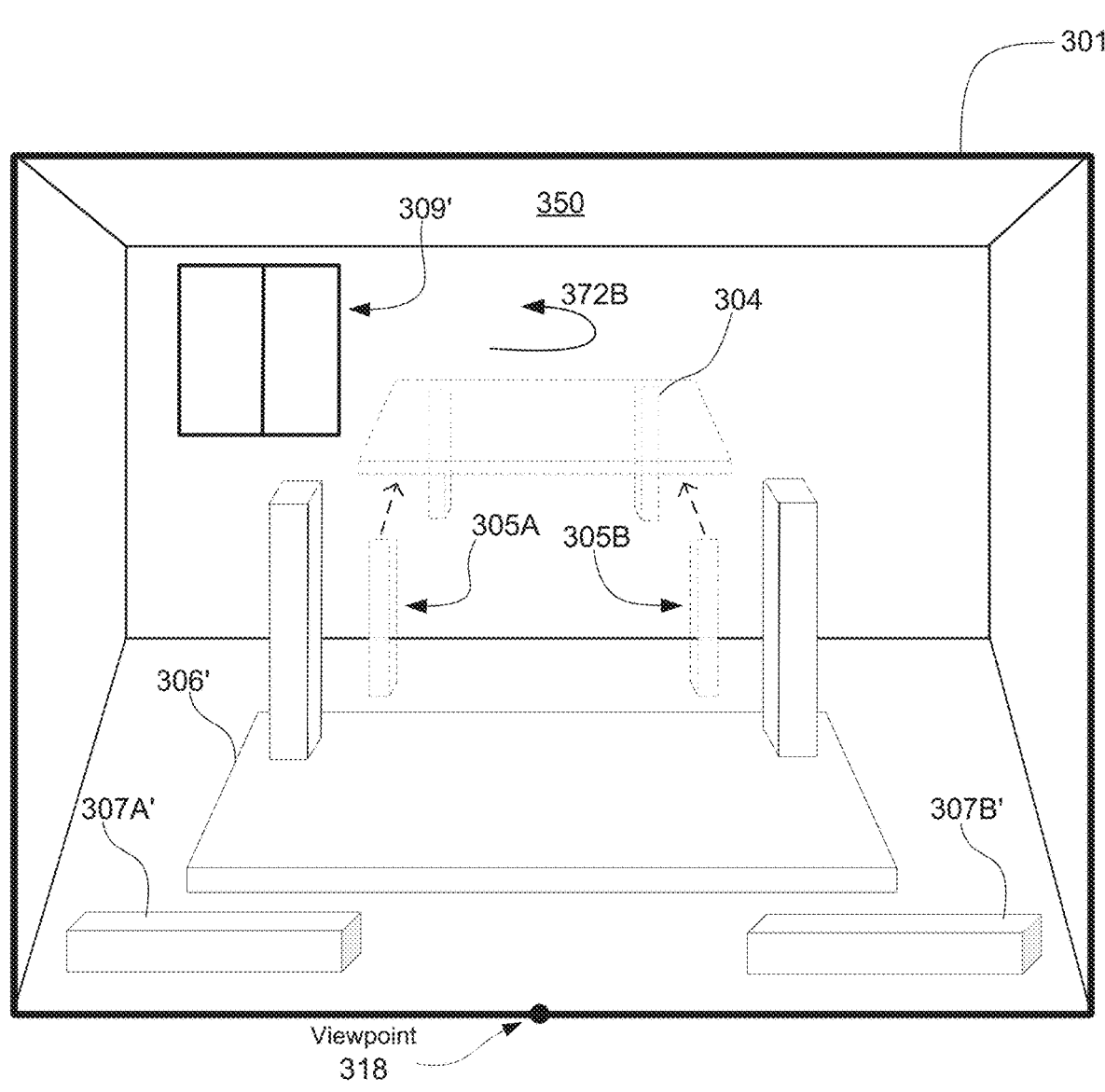

As mentioned previously above, in some examples, the virtual object 304 is a virtual rendering of the table 306 in the physical environment surrounding the electronic device 301. Additionally, as mentioned previously above, the virtual object 304 may be associated with an application (e.g., a furniture assembly application) running on the electronic device 301 that is configured to assist the user with assembling the real-world table 306 that is visible in the field of view of the user. For example, as shown in FIG. 3B, the virtual object 304 may be displayed with an animation that visually illustrates a next step in assembling the real-world table 306 (e.g., visible in the three-dimensional environment 350 as the representation 306'). As shown in FIG. 3B, the animation of the virtual object 304 optionally indicates that the next step in assembling the real-world table 306 includes attaching a first leg 305A and attaching a second leg 305B to a bottom surface of the tabletop of the virtual table 304. In some examples, the first leg 305A and the second leg 305B of the virtual table 304 correspond to the leg 307B (e.g., visible in the three-dimensional environment 350 as the representation 307B') and leg 307A (e.g., visible in the three-dimensional environment 350 as the representation 307A') of the real-world table 306, respectively. As shown in FIG. 3B and as similarly discussed above, in some examples, the electronic device 301 rotates the virtual object 304 (e.g., in the yaw direction) about a vertical axis through the virtual object 304 from the viewpoint 318 of the user (e.g., to enable the user to view a side and/or rear portions of the virtual table for assembling the real-world table 306).

In some examples, while the virtual object 304 is displayed in the tilt locked orientation (or the head or world locked orientation) in the three-dimensional environment 350, the user may desire to interact with the representation of the table 306' in the three-dimensional environment 350 (e.g., the real-world table in the physical environment surrounding the electronic device 301). For example, the user may move their head to identify and/or locate one or more parts/components for assembling the real-world table 306. In some examples, because the user is wearing the electronic device 301 in the example of FIG. 3B, movement of the head of the user optionally causes the viewpoint 318 of the user to change in the three-dimensional environment 350, as discussed below.

Figure 3C:
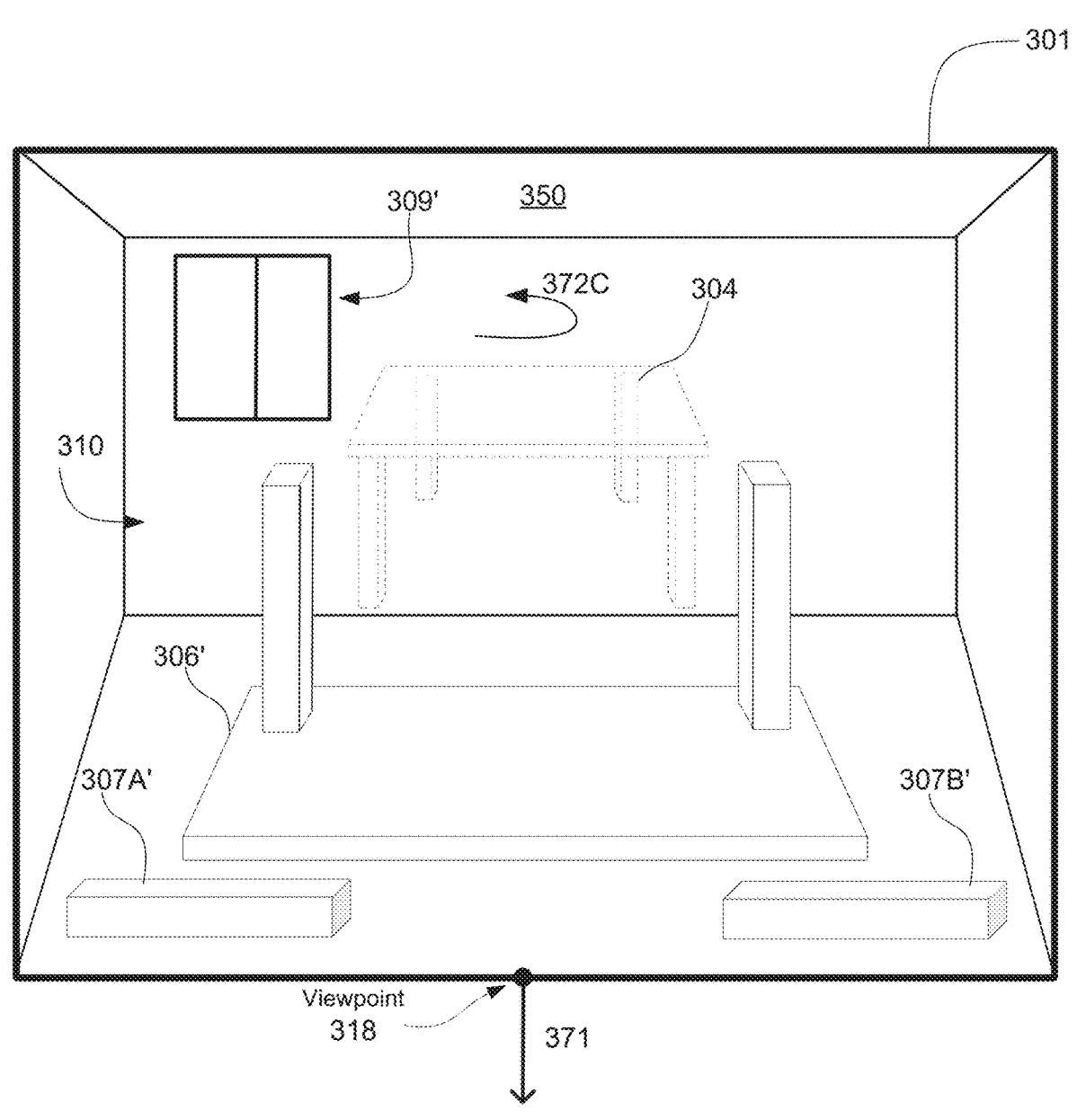

In FIG. 3C, while the virtual object 304 is displayed in the tilt locked (or head locked) orientation in the three-dimensional environment 350, the electronic device 301 optionally detects (e.g., radial) movement of the viewpoint 318 of the user relative to the three-dimensional environment 350. For example, as shown in FIG. 3C, the electronic device 301 is moved radially downward in the pitch direction, as represented by arrow 371, in the physical environment surrounding the electronic device 301 (e.g., because the head of the user wearing the electronic device 301 moves downward in the pitch direction), which causes the display generation component of the electronic device 301 to also move downward in the physical environment. In some examples, the movement of the viewpoint 318 of the user corresponds to tilting of the head of the user toward the floor of the physical environment in which the electronic device 301 is located (e.g., to locate the representation of the first leg 307A' and/or the representation of the second leg 307B' for assembling the representation of the table 306' (e.g., corresponding to the real-world table in the physical environment)).

Figure 3D:
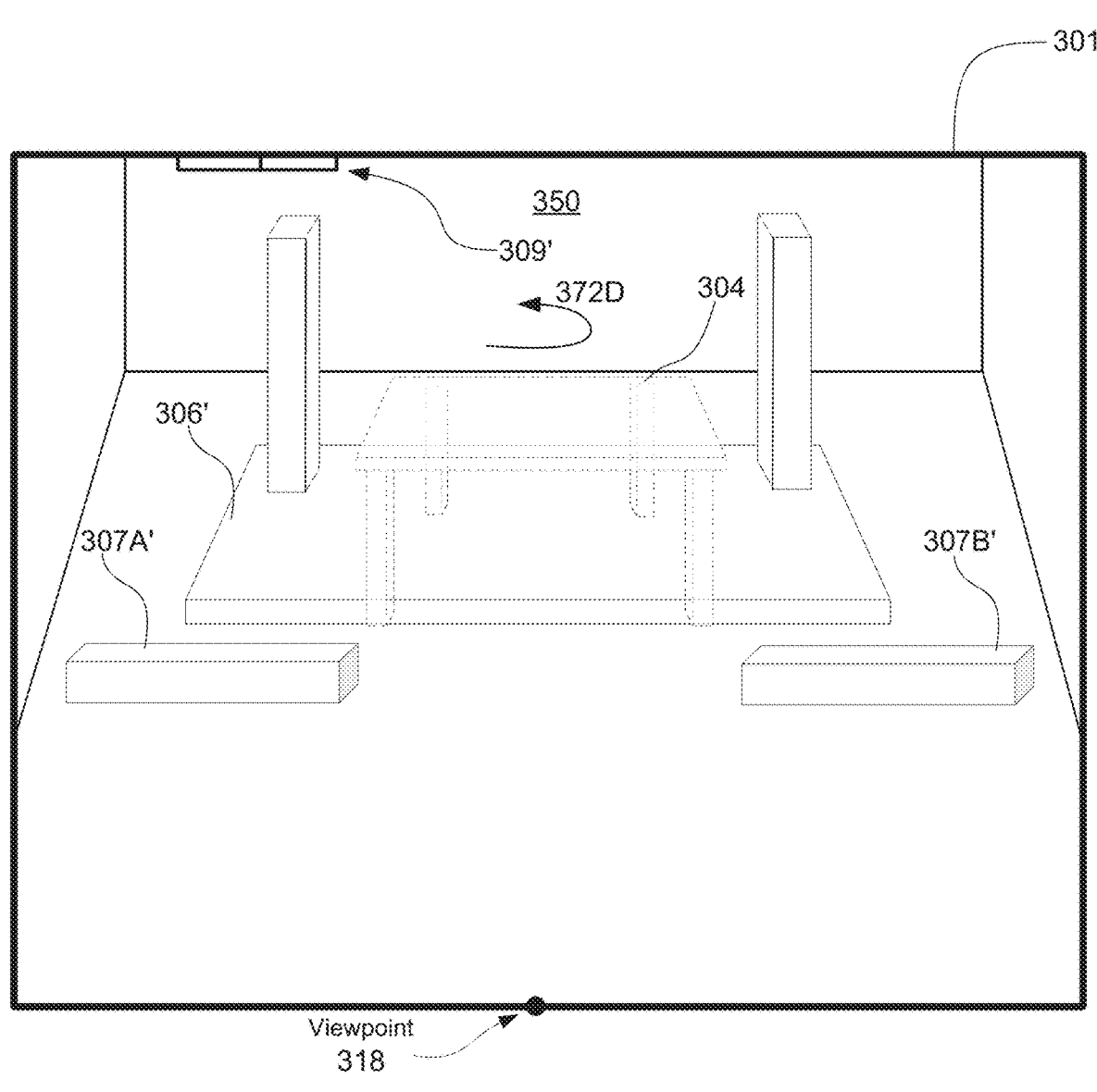

In some examples, as shown in FIG. 3D, in response to detecting the movement of the viewpoint 318 of the user of the electronic device 301, the electronic device 301 updates presentation of the three-dimensional environment 350. For example, as shown in FIG. 3D, the downward movement of the viewpoint 318 of the user causes the representation of the table 306' (including the representation of the first leg 307A' and the representation of the second leg 307B') and the representation of the window 309' to be shifted upward in the view of the three-dimensional environment 350 for the new viewpoint of the user. Additionally, because the viewpoint 318 has moved downward in the pitch direction, a greater portion of the floor of the physical environment is visible in the view of the three-dimensional environment 350, as shown in FIG. 3D.

In some examples, as previously mentioned above, in response to detecting the downward movement of the viewpoint 318 of the user, the electronic device 301 moves the virtual object 304 in the three-dimensional environment 350 based on the movement of the viewpoint 318. For example, as shown in FIG. 3D, because the virtual object 304 is tilt locked (or head locked), the electronic device 301 moves the virtual object 304 to maintain the same distance and/or orientation offset relative to the predefined portion of the body of the user (e.g., the user's torso) in the three-dimensional environment 350. As shown in FIG. 3D, the virtual object 304 is optionally still displayed centrally in the user's field of view in the three-dimensional environment 350. In some examples, as shown in FIG. 3D, the electronic device 301 continues to rotate the virtual object 304 about a vertical axis through the virtual object 304, as represented by arrow 372D, in the three-dimensional environment 350.

As mentioned above, the user optionally causes the viewpoint 318 to be moved downward (e.g., in the pitch direction) relative to the three-dimensional environment 350 such that the representations of the first leg 307A' and the second leg 307B' are more prominently presented in the field of view of the user (e.g., are presented more centrally in the user's field of view). In such an instance, the user may directly interact with the first leg 307A or the second leg 307B (e.g., pick up with first leg 307A or the second leg 307B) to attach it to the bottom surface of the tabletop of the table 306 (e.g., according to the instructions provided via the animation of the virtual object 304 in FIG. 3B). However, as shown in FIG. 3D, because the virtual object 304 is tilt locked (or head locked) in the three-dimensional environment 350, the virtual object 304 occupies a significant portion of the user's field of view (e.g., a center or near center portion of the user's field of view). As shown in FIG. 3D, in such an instance, the virtual object 304 is at least partially overlapping the representation of the table 306' in the three-dimensional environment 350, which optionally prevents the user from being able to view certain portions of the representation of the table 306' and/or otherwise hinders the user's ability to interact with the representation of the table 306'. For example, because the virtual object 304 is displayed relative to the user's torso in the three-dimensional environment 350 when the virtual object 304 is tilt locked, moving the viewpoint 318 closer to the representation of the table 306' (e.g., in response to detecting the user walk/move closer to the real-world table in the physical environment), the virtual object 304 will continue to occupy significant portions of the field of view of the user as similarly shown in FIG. 3D, which would prevent the user from and/or hinder the user's ability to assemble the real-world table 306 (e.g., due to the table sockets into which the table legs 307A and/or 307B are inserted and fixed to being blocked/overlapped by the virtual object 304).

Figure 3E:
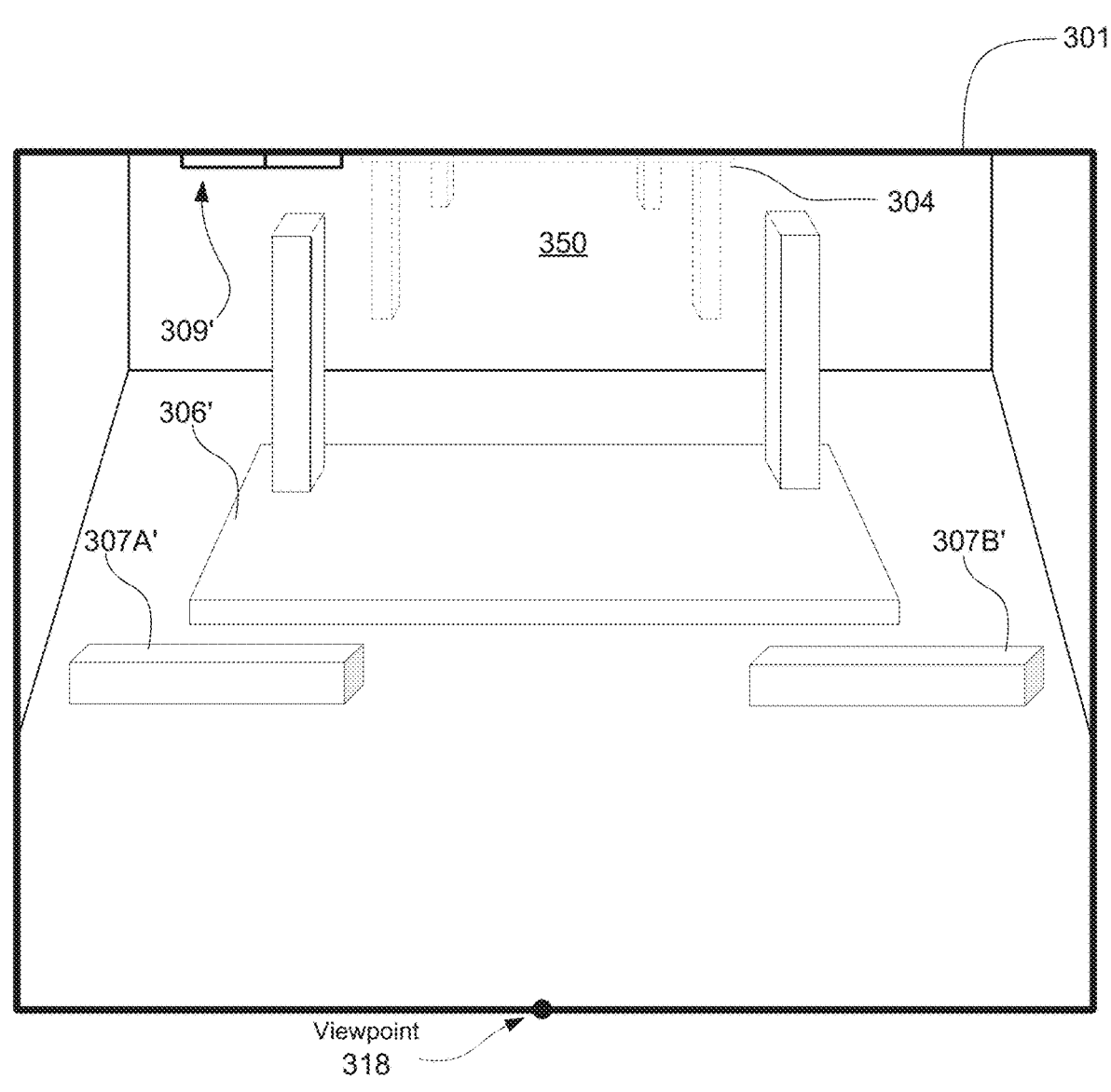

In some examples, as mentioned above, the virtual object 304 may alternatively be displayed in the world locked orientation in the three-dimensional environment 350 when the movement of the viewpoint 318 is detected in FIG. 3C. In some such examples, in response to detecting the downward movement of the viewpoint 318 of the user in FIG. 3C, the electronic device 301 forgoes moving the virtual object in the three-dimensional environment 350 based on the movement of the viewpoint 318, as shown in FIG. 3E. For example, as shown in FIG. 3E, the virtual object 304 is not displayed in the three-dimensional environment 350 at the same distance or orientation offset relative to the user of the electronic device 301 as shown previously in FIG. 3C. In some examples, because the virtual object 304 is world locked in the three-dimensional environment 350, the virtual object 304 remains displayed at the same location (as in FIG. 3C) in the three-dimensional environment 350 irrespective of the movement of the viewpoint 318. Accordingly, as shown in FIG. 3E, the virtual object 304 is shifted upward in the view of the three-dimensional environment 350 for the new viewpoint 318 of the user.

While displaying the virtual object 304 in the world locked orientation in the three-dimensional environment 350 enables the representation of the table 306' (including the representations of the first leg 307A' and the second leg 307B') to be presented (e.g., visible) in the three-dimensional environment 350 without at least partially being obscured and/or distracted by the virtual object 304, as discussed above, when the viewpoint 318 of the user is angled toward the ground, the display of the virtual object 304 in the world locked orientation may cause the virtual object 304 to be displayed partially or completely out of view in the three-dimensional environment 350. For example, as shown in FIG. 3E, the top surface of the virtual object 304 is not displayed (e.g., not visible) in the three-dimensional environment 350 when the viewpoint 318 of the user is directed toward the floor of the physical environment surrounding the electronic device 301. In such an instance, the user is unable to refer to the virtual object 304 (or particular portions of the virtual object 304) without again looking up away from the floor of the physical environment, which could delay the assembly process of the real-world table 306 and/or cause the assembly process of the real-world table 306 to be more difficult than necessary (and thus inefficient). Displaying the virtual object 304 in the tilt locked (or head locked) orientation or the world locked orientation may be desirable when the viewpoint 318 of the user is angled toward a horizon of the field of view of the user, as discussed above with reference to FIG. 3A, because the virtual object 304 is displayed centrally in the user's field of view and away from physical objects in the physical environment surrounding the electronic device 301. However, as illustrated in FIG. 3D, displaying the virtual object 304 in the tilt locked (or head locked) orientation causes, in certain instances, the virtual object 304 to overlap with the one or more physical objects (e.g., the representation of the table 306' including the representations of the first leg 307A' and the second leg 307B') relative to the viewpoint 318 of the user when the user looks toward the ground (e.g., when the viewpoint 318 is angled parallel to gravity).

Accordingly, it may be advantageous to provide a method for minimizing (e.g., reducing in size) display of the virtual object 304 in the view of the three-dimensional environment 350, whereby the virtual object 304 is seamlessly transitioned between tilt locked/world locked and head locked in the three-dimensional environment 350 in response to detecting movement of the viewpoint 318 of the user. In some examples, as described below, the electronic device 301 displays the virtual object 304 in a minimized (e.g., reduced in size) state and transitions from displaying the virtual object 304 in tilt locked/world locked to head locked in response to detecting an event that satisfies one or more criteria. As discussed herein, in some examples, when the virtual object 304 is displayed in the head locked orientation in the three-dimensional environment 350, the virtual object 304 is displayed relative to the head of the user from the viewpoint 318. Attention is now directed to example interactions with a virtual object that include movement of the viewpoint of the user of the electronic device while the virtual object is displayed in a particular orientation in a three-dimensional environment.

Figure 4A:
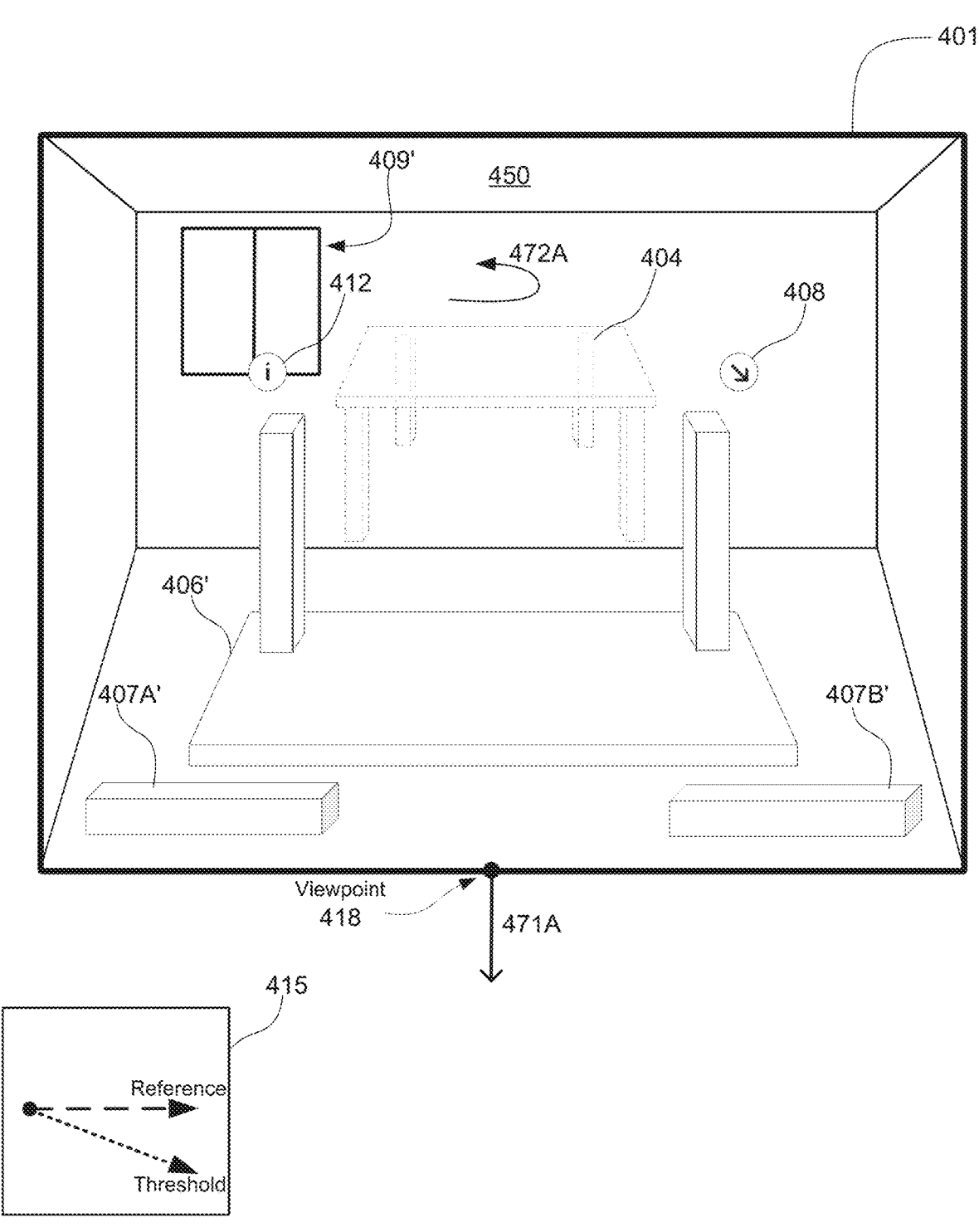
FIGS. 4A-4K illustrate example interactions for minimizing and maximizing display of an object between tilt locked or world locked orientation and head locked orientation in a three-dimensional environment according to some examples of the disclosure.

FIGS. 4A-4K illustrate example interactions for minimizing and maximizing display of an object between tilt locked (or head locked) or world locked orientation and head locked orientation in a three-dimensional environment according to some examples of the disclosure. In some examples, as shown in FIG. 4A, a three-dimensional environment 450 may be presented using electronic device 401. In some examples, the electronic device 401 optionally corresponds to electronic device 301 discussed above. In some examples, the three-dimensional environment 450 includes captured portions of the physical environment in which electronic device 401 is located. For example, the three-dimensional environment 450 optionally includes a table (e.g., a representation of table 406' including representations of a first leg 407A' and a second leg 407B') and a window (e.g., representation of window 409'), as shown in FIG. 4A. In some examples, the three-dimensional environment 450 optionally corresponds to three-dimensional environment 350 described above. In some examples, the representations can include portions of the physical environment viewed through a transparent or translucent display of electronic device 401.

As similarly discussed above, in some examples, the three-dimensional environment 450 may include one or more virtual objects that are displayed with a particular orientation relative to a viewpoint of a user of the electronic device 401. For example, as shown in FIG. 4A, the three-dimensional environment 450 at the electronic device 401 may include virtual object 404, which is optionally a virtual representation (e.g., rendering, model, scan, point cloud representation, etc.) of the real-world table 406 in the physical environment surrounding the electronic device 401. Additionally, as previously discussed above, the virtual object 404 may be associated with an application (e.g., a furniture assembly application) running on the electronic device 401 that guides the user (e.g., via visual cues, such as animations, step-by-step instructions, audio instructions, etc.) in assembling the real-world table 406 (e.g., visible in the three-dimensional environment 450 as the representation 406'). In some examples, the virtual object 404 corresponds to virtual object 304 described above. Additionally, as shown in FIG. 4A, while the electronic device 401 is displaying the virtual object 404 in the three-dimensional environment 450, the electronic device 401 optionally rotates the virtual object 404 about a vertical axis through the virtual object 404 (e.g., in the yaw direction) relative to the viewpoint 418 of the user, as represented by arrow 472A, as similarly discussed above.

Additionally, in some examples, as shown in FIG. 4A, the virtual object 404 may be displayed with one or more selectable options in the three-dimensional environment 450. For example, as shown in FIG. 4A, the three-dimensional environment 450 includes a first selectable option 408 and a second selectable option 412. In some examples, the first selectable option 408 may be selectable to cause the virtual object to be displayed in a minimized state, as discussed in more detail herein later. In some examples, the second selectable option 412 may be selectable to display additional information corresponding to the virtual object 404. For example, the electronic device 401 displays textual instructions for assembling the real-world table 406, information regarding a manufacturer of the real-world table, one or more images (e.g., close-up images) for aiding the assembly of the real-world table 406, etc. In FIG. 4A, if the virtual object 404 is displayed in the tilt locked (or head locked) orientation in the three-dimensional environment 450, the electronic device 401 displays the one or more selectable options at fixed distance and/or orientation offsets relative to the predefined portion of the user's body (e.g., the user's torso or head). Alternatively, in FIG. 4A, if the virtual object 404 is displayed in the world locked orientation in the three-dimensional environment 450, the electronic device 401 displays the one or more selectable options at fixed distance and/or orientation offsets relative to a coordinate system of the three-dimensional environment 450.

In some examples, as similarly described herein above, the virtual object 404 may be displayed in a particular orientation in the three-dimensional environment 450. For example, the virtual object 404 may be displayed in a body locked, tilt locked, head locked, or world locked orientation in the three-dimensional environment 450. In some examples, as previously discussed above, displaying the virtual object 404 in only one of these orientations in the three-dimensional environment 450 may not enable the user to efficiently and continuously view and/or interact with the virtual object 404 and/or other objects in the three-dimensional environment 450 when the viewpoint 418 of the user changes. For example, as previously discussed above, if the virtual object 404 is world locked in the three-dimensional environment 450, movement of the viewpoint 418 may cause the virtual object 404 (e.g., or a portion of the virtual object 404) to no longer be displayed in the portion of the three-dimensional environment 450 that is in the user's new field of view (e.g., as similarly shown in FIG. 3E). In some examples, if the virtual object 404 is tilt locked (or head locked) in the three-dimensional environment 450, movement of the viewpoint 418 (e.g., to be angled toward a ground of the physical environment surrounding the electronic device 401) may cause the virtual object 404 to obstruct (e.g., overlap) and/or distract from the view of one or more second objects in the three-dimensional environment 450, such as the representation of the table 406' and/or the representations of the first leg 407A' and the second leg 407B' (e.g., as similarly shown in FIG. 3D).

Accordingly, in some examples, a virtual object (e.g., such as virtual object 404) that is displayed as tilt locked or world locked (or head locked) in the three-dimensional environment 450 may be transitioned from a maximized state to a minimized state in which the virtual object is displayed as head locked to provide a seamless and continuous viewing experience of the virtual object 404 and/or other objects in the three-dimensional environment 450 despite movement of the viewpoint 418 of the user (or other triggers detected by the electronic device 401). For example, in FIG. 4A, the virtual object 404 is displayed in the maximized state in the three-dimensional environment 450. In some examples, while displayed in the maximized state, the virtual object 404 is displayed centrally in the field of view of the user and is displayed at a first size (e.g., a first predetermined size) in the three-dimensional environment 450 from the viewpoint 418 of the user. In some examples, as discussed in more detail below, when the electronic device 401 displays the virtual object 404 in the head locked orientation in the three-dimensional environment when the virtual object 404 is displayed in the minimized state, the virtual object 404 is displayed at a location in the three-dimensional environment 450 that is a fixed distance and orientation relative to the user's head.

In some examples, the electronic device 401 transitions between displaying the virtual object 404 in maximized state and displaying the virtual object 404 in a minimized state in the three-dimensional environment 450 in response to detecting an event that satisfies one or more criteria. In some examples, detecting the event at the electronic device 401 includes detecting movement of the viewpoint 418 of the user beyond a threshold movement (e.g., an angular threshold, as discussed in more detail below), as represented by "Threshold" arrow in legend 415, relative to a reference ray, as represented by "Reference" arrow in the legend 415, in the pitch direction. In some examples, if the detected event does not satisfy the one or more criteria, the electronic device 401 does not transition from displaying the virtual object 404 in the maximized state to displaying the virtual object 404 in the minimized state in the three-dimensional environment 450. For example, in accordance with a determination that the movement of the viewpoint 418 does not exceed the threshold movement, the electronic device 401 maintains display of the virtual object 404 in the maximized state (e.g., and in a tilt locked, head locked, or world locked orientation).

In FIG. 4A, while displaying the virtual object 404 in the maximized state and in the world locked or tilt locked (or head locked) orientation in the three-dimensional environment 450, the electronic device 401 optionally detects (e.g., radial) movement of the viewpoint 418 of the user relative to the three-dimensional environment 450. For example, as shown in FIG. 4A, the electronic device 401 detects (e.g., radial) movement of the viewpoint 418 of the user downward in the pitch direction, as represented by arrow 471A. In some examples, as similarly discussed above, the movement of the viewpoint 418 of the user may correspond to movement of the electronic device 401 (e.g., including the display generation component of the electronic device 401) downward in the pitch direction and directed toward the ground of the physical environment surrounding the electronic device 401. For example, as similarly discussed above with reference to FIGS. 3B-3C, the user may look down toward the floor of the physical environment to identify and/or locate one or more parts in the three-dimensional environment 450 (e.g., such as the representation of the first leg 407A' and/or the representation of the second leg 407B') for assembling the representation of the table 406' (e.g., corresponding to the real-world table in the physical environment).

Figure 4B:
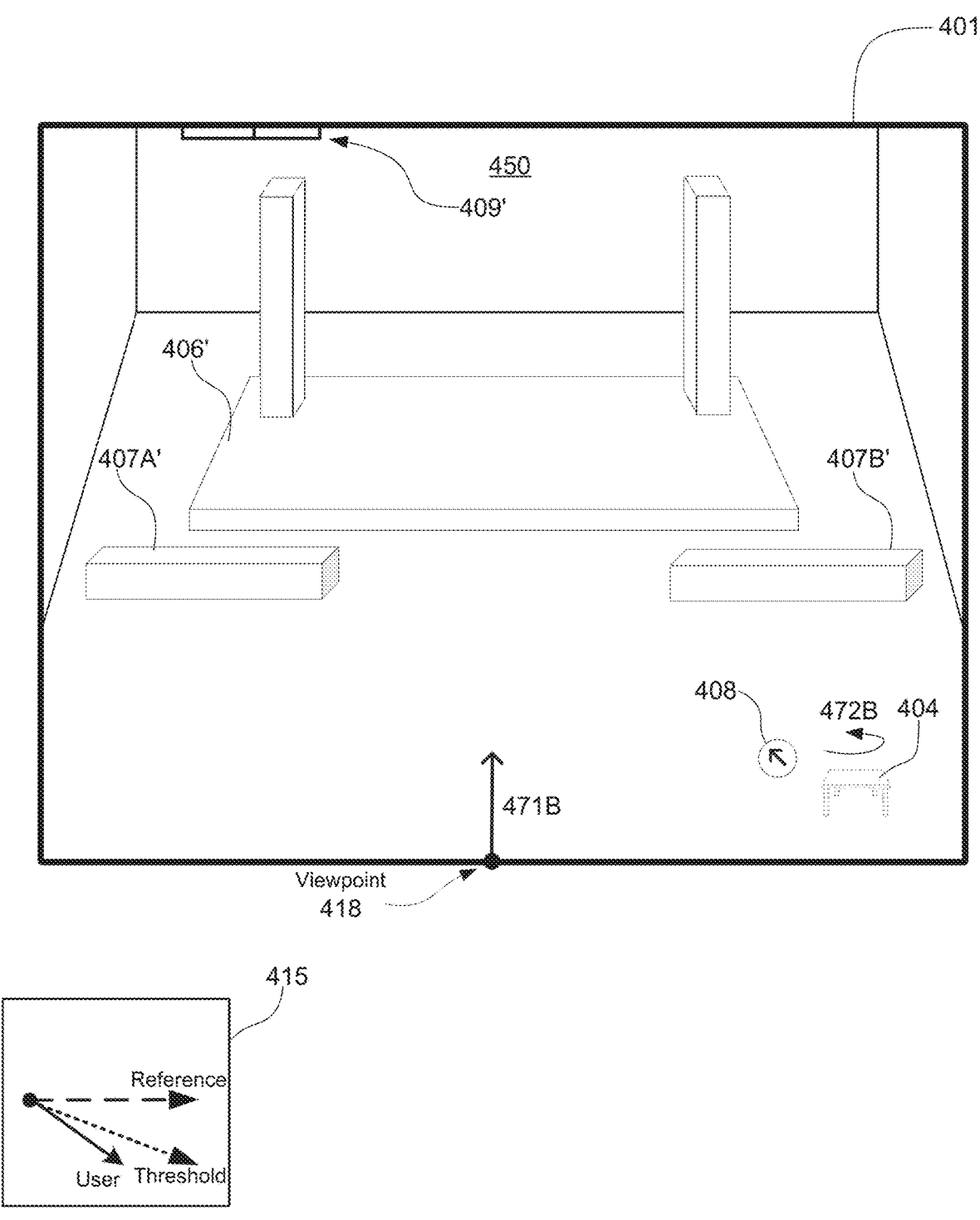

In some examples, in response to detecting the movement of the viewpoint 418 of the user in the pitch direction, the electronic device 401 updates presentation of the three-dimensional environment 450 based on the movement of the viewpoint 418. For example, as shown in FIG. 4B, the representation of the table 406' (including the representation of the first leg 407A' and the representation of the second leg 407B') and the representation of the window 409' are shifted upward in the view of the three-dimensional environment 450 in accordance with the movement of the viewpoint 418 downward in the pitch direction. Additionally, as shown in FIG. 4B, the viewpoint 418 of the user is angled downward toward a portion of the ground of the physical environment surrounding the electronic device 401. Accordingly, in FIG. 4D, a greater portion of the ground/floor of the physical environment is visible in the field of view of the user, such that the representation of the first leg 407A' and the representation of the second leg 407B' are more prominent in the field of view of the user (e.g., presented more centrally in the field of view of the user than in FIG. 4A), which enables the user to identify and/or locate the representation of the first leg 407A' and the representation of the second leg 407B' for assembling the representation of the table 406' in the three-dimensional environment.

In some examples, as mentioned above, in response to detecting an event at the electronic device 401 while the virtual object 404 is displayed in the maximized state in the three-dimensional environment 450, in accordance with a determination that the event satisfies one or more criteria, the electronic device 401 transitions to displaying the virtual object 404 in the minimized state in the three-dimensional environment 450. For example, in response to detecting the movement of the viewpoint 418 of the user, if the movement of the viewpoint 418 exceeds the threshold movement mentioned above, the electronic device 401 transitions from displaying the virtual object 404 in the maximized state and in the tilt locked/world locked orientation to displaying the virtual object 404 in the minimized state and in the head locked orientation. In some examples, the reference against which the threshold movement is measured corresponds to a ray intersecting the horizon of the field of view of the user (e.g., a ray extending away from the viewpoint 418 of the user straight toward the back wall of the physical environment surrounding the electronic device 401). In some examples, as illustrated in the legend 415 in FIG. 4B, the reference ray is normal to the force of gravity. In some examples, as mentioned above, the threshold movement corresponds to an angular threshold. For example, the movement of the viewpoint 418 exceeds the threshold movement if the electronic device 401 detects movement of the viewpoint 418 beyond –10, 15, 20, 25, 30, 35, etc. degrees in the pitch direction relative to the reference ray (e.g., illustrated in the legend 415). It should be understood that, in some examples, the threshold movement may correspond to additional or alternative thresholds, such as distance thresholds, time thresholds, speed thresholds, etc.

In some examples, as shown in FIG. 4B, in response to detecting the movement of the viewpoint 418 of the user downward in the pitch direction, the electronic device 401 determines that the movement of the viewpoint 418 exceeds the threshold movement (e.g., the angular threshold) discussed above. For example, as shown in FIG. 4B, the movement of the viewpoint 418 further downward in the pitch direction causes the viewpoint 418 of the user to exceed the angular threshold, as represented by the user ray crossing the threshold ray relative to the reference ray in the legend 415. In some examples, as shown in FIG. 4B, in accordance with the determination that the movement of the viewpoint 418 of the user exceeds the threshold movement discussed above, the electronic device 401 transitions from displaying the virtual object 404 in the maximized state and in the tilt locked/world locked orientation to displaying the virtual object 404 in the minimized state and in the head locked orientation in the three-dimensional environment 450, as described in more detail below.

In some examples, transitioning from displaying the virtual object 404 in the maximized state and in the tilt locked/world orientation to displaying the virtual object 404 in the minimized state and in the head locked orientation includes displaying an animation of the transition between the two states in the three-dimensional environment 450. For example, as shown in FIG. 4B, displaying the virtual object 404 in the minimized state includes displaying the virtual object 404 at a smaller size in the three-dimensional environment 450 than in FIG. 4A. Additionally, in some examples, displaying the virtual object 404 in the minimized state includes displaying the virtual object 404 at a corner (e.g., the bottom right corner) of a field of view of the user in the three-dimensional environment 450. Accordingly, displaying the animation of the transition from displaying the virtual object 404 in the maximized state to displaying the virtual object 404 in the minimized state includes gradually decreasing the size of the virtual object 404 from the first size shown in FIG. 4A to the second size shown in FIG. 4B and gradually moving the virtual object 404 from the center of the field of view of the user to the corner of the field of view of the user in the three-dimensional environment 450. In some examples, the electronic device 401 transitions from displaying the virtual object 404 in the maximized state to the minimized state over a predetermined amount of time (e.g., 0.25, 0.5, 0.75, 1, 2, 3, 5, etc. seconds) from when the electronic device 401 determines that the movement of the viewpoint 418 exceeds the threshold movement.

Additionally, as mentioned above, while displaying the virtual object 404 in the minimized state, the electronic device 401 displays the virtual object 404 in the head locked orientation in the three-dimensional environment 450. In some examples, while the virtual object 404 is displayed in the head locked orientation in the three-dimensional environment 450, the electronic device 401 displays the virtual object 404 at a fixed distance and orientation offset relative to the head of the user. Accordingly, if the viewpoint 418 of the user moves further (e.g., translates along the X, Y, and/or Z axis or rotates in the yaw direction, roll direction, and/or in the pitch direction), the electronic device 401 moves the virtual object 404 in the three-dimensional environment 450 based on the movement of the viewpoint 418, such that the virtual object 404 remains displayed at the corner of the field of view of the user as shown in FIG. 4B. As such, as shown in FIG. 4B, with the virtual object 404 displayed in the minimized state in the three-dimensional environment 450, the representation of the table 406' and the representations of the first leg 407A' and the second leg 407B' are presented (e.g., visible) in the three-dimensional environment 450 in an unobstructed manner. For example, as shown in FIG. 4B, the virtual object 404 is not overlapping with any portion of the representation of the table 406' and the representations of the first leg 407A' and the second leg 407B' from the viewpoint 418 of the user. In this way, the user may interact with (e.g., view, pick up, walk toward, etc.) the first leg 407A and/or the second leg 407B in the physical environment surrounding the electronic device 401 to assemble the real-world table 406 as similarly discussed above without the display of the virtual object 404 interfering and/or distracting from the assembly, while still maintaining display of the virtual object 404 in the field of view of the user (e.g., in the corner as shown in FIG. 4B) for visual reference during the assembly of the real-world table 406.

Additionally, as shown in FIG. 4B, in some examples, when the electronic device 401 displays the virtual object 404 in the minimized state in the three-dimensional environment, the electronic device 401 updates display of the one or more selectable options in the three-dimensional environment 450. For example, as shown in FIG. 4B, the electronic device 401 displays the first option 408 with the virtual object 404 while the virtual object 404 is displayed in the corner of the field of view of the user in the three-dimensional environment 450. In some examples, while the virtual object 404 is displayed in the minimized state, the electronic device 401 updates the functionality associated with the first option 408. For example, the first option 408 is selectable to redisplay the virtual object in the maximized state, as described in more detail later. In FIG. 4B, because the virtual object 404 is displayed in the head locked orientation in the three-dimensional environment 450, the electronic device 401 displays the first option 408 at a fixed distance and orientation offset relative to the user's head. Additionally, as shown in FIG. 4B, while the virtual object 404 is displayed in the minimized state, the electronic device 401 continues to rotate the virtual object 404 about a vertical axis through the virtual object 404 (e.g., in the yaw direction) in the three-dimensional environment 450, as represented by arrow 472B. Accordingly, as described above, transitioning from displaying the virtual object 404 in the maximized state to displaying the virtual object 404 in the minimized state in the three-dimensional environment 450 in response to detecting movement of the viewpoint 418 of the user that exceeds the movement threshold (e.g., the angular threshold) enables the one or more physical objects in the three-dimensional environment 450 to be viewed and/or interacted with in an unobscured manner irrespective of a direction of the viewpoint 418 in the three-dimensional environment 450.

In some examples, while the virtual object 404 is displayed in the minimized state in the three-dimensional environment 450, the electronic device 401 redisplays the virtual object 404 in the maximized state in response to detecting an event (e.g., a second event) that satisfies one or more second criteria. In FIG. 4B, while the electronic device 401 is displaying the virtual object 404 in the minimized state in the three-dimensional environment 450, the electronic device 401 detects (e.g., radial) movement of the viewpoint 418 of the user upward in the pitch direction relative to the three-dimensional environment 450. For example, as shown in FIG. 4B, while the virtual object 404 is displayed in the head locked orientation in the corner of the field of view of the user in the three-dimensional environment 450, the electronic device 401 is moved upward in the pitch direction in the physical environment surrounding the electronic device 401. In some examples, as similarly discussed above, the movement of the viewpoint 418 of the user upward in the pitch direction corresponds to upward tilt of the head of the user in the pitch direction away from the floor of the physical environment.

Figure 4C:
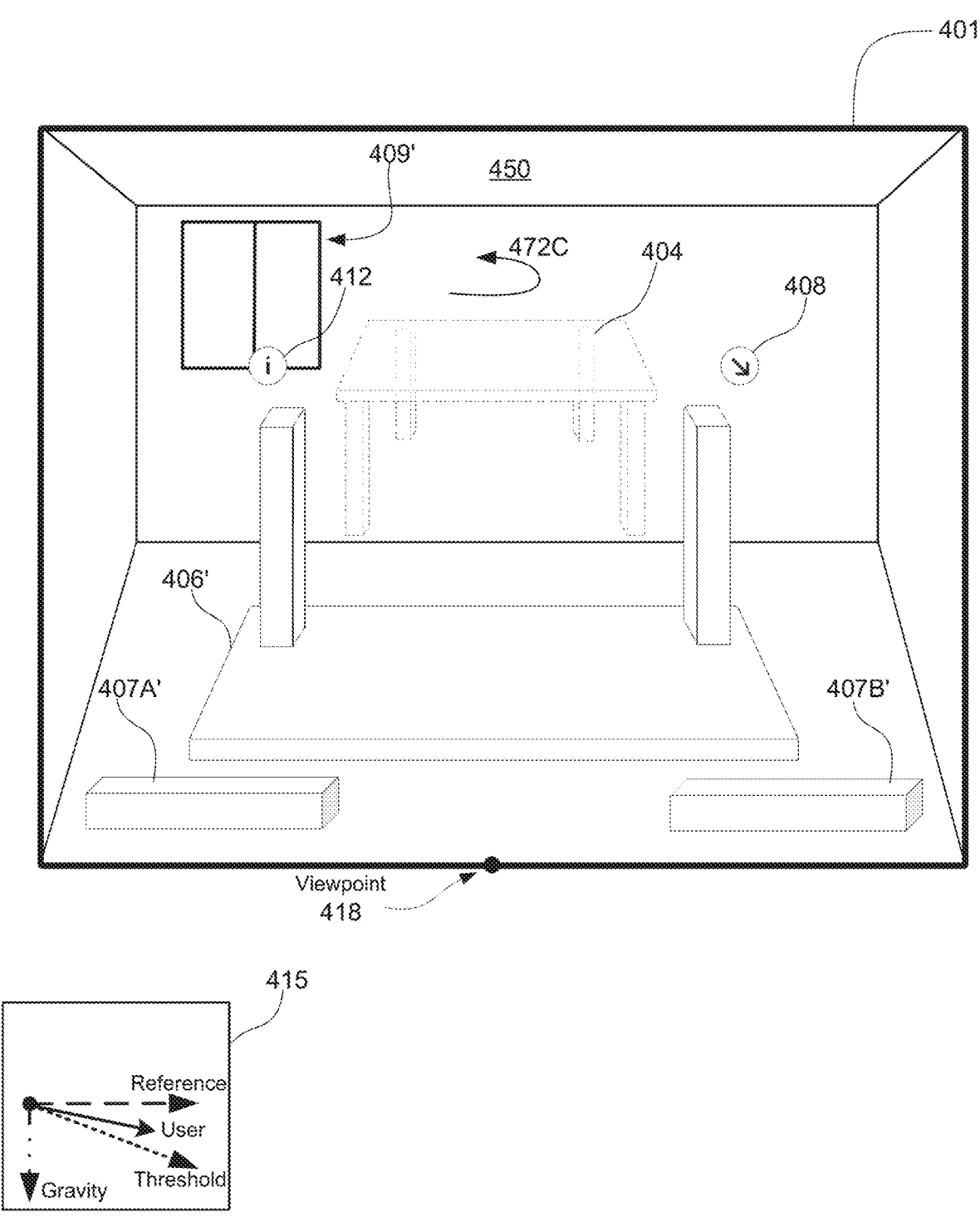

In some examples, as shown in FIG. 4C, in response to detecting the movement of the viewpoint 418 of the user upward in the pitch direction, the electronic device 401 updates presentation of the three-dimensional environment 450 based on the movement of the viewpoint 418. For example, as shown in FIG. 4C, the upward movement of the electronic device 401 has caused a portion of the walls of the physical environment surrounding the electronic device 401 to be visible again in the field of view of the user. Additionally, as shown in FIG. 4C, in response to detecting the upward movement of the viewpoint 418, the representation of the table 406' (including the representations of the first leg 407A' and the second leg 407B') and the representation of the window 409' are shifted downward in the view of the three-dimensional environment 450 in accordance with the movement of the viewpoint 418.

In some examples, as similarly discussed above, in response to detecting a second event, the electronic device 401 determines whether the second event satisfies the one or more second criteria. For example, the one or more second criteria include a criterion that is satisfied if the upward movement of the viewpoint 418 exceeds the threshold movement (e.g., the angular threshold) relative to gravity. As shown in FIG. 4C, the viewpoint 418, represented by the user ray in the legend 415, has moved upward toward the reference ray intersecting the horizon of the field of view of the user and has crossed the angular threshold, represented by the threshold ray in the legend 415, relative to the force of gravity. Accordingly, in some examples, the electronic device determines that the upward movement of the viewpoint 418 exceeds the movement threshold and thus the one or more second criteria are satisfied. In some examples, as shown in FIG. 4C, in accordance with the determination that the movement of the viewpoint 418 exceeds the movement threshold relative to gravity, the electronic device 401 redisplays the virtual object 404 in the maximized state in the three-dimensional environment 450, as discussed below.

In some examples, as similarly discussed above, the electronic device 401 gradually transitions from displaying the virtual object 404 in the minimized state to displaying the virtual object 404 in the maximized state in the three-dimensional environment 450. For example, as shown in FIG. 4C, when the electronic device 401 redisplays the virtual object 404 in the maximized state in the three-dimensional environment 450, the electronic device 401 redisplays the virtual object 404 at the size shown in FIG. 4A and redisplays the virtual object 404 in a center portion of the field of view of the user in the three-dimensional environment 450. In some examples, transitioning from displaying the virtual object 404 in the minimized state to displaying the virtual object 404 in the maximized state includes gradually increasing the size of the virtual object 404 from the second size shown in FIG. 4B to the first size shown in FIG. 4A and gradually moving the virtual object 404 from the corner location of the field of view of the user in FIG. 4B to the center location of the field of view of the user in FIG. 4C. Additionally, as similarly discussed above, when the electronic device 401 redisplays the virtual object 404 in the maximized state in the three-dimensional environment 450, the electronic device 401 redisplays the virtual object 404 in the tilt locked/world locked orientation in the three-dimensional environment 450 (and no longer displays the virtual object 404 in the head locked orientation).

Additionally, in some examples, when the electronic device 401 redisplays the virtual object 404 in the maximized state in the three-dimensional environment 450, the electronic device 401 updates display of the one or more selectable options in the three-dimensional environment 450. For example, as shown in FIG. 4C, the electronic device 401 redisplays the first option 408 and the second option 412 with the virtual object 404 at the center of the field of view of the user. In some examples, when the electronic device 401 redisplays the virtual object 404 in the maximized state in the three-dimensional environment 450, the electronic device 401 updates the functionality associated with the first option 408. For example, in FIG. 4C, the first option 408 is now selectable to cause the virtual object 404 to be displayed in the minimized state in the three-dimensional environment 450, as discussed previously with reference to FIG. 4A. Additionally, as shown in FIG. 4C, while the virtual object 404 is displayed in the maximized state, the electronic device 401 continues to rotate the virtual object 404 about a vertical axis through the virtual object 404 (e.g., in the yaw direction) in the three-dimensional environment 450, as represented by arrow 472C.

Figure 4D:
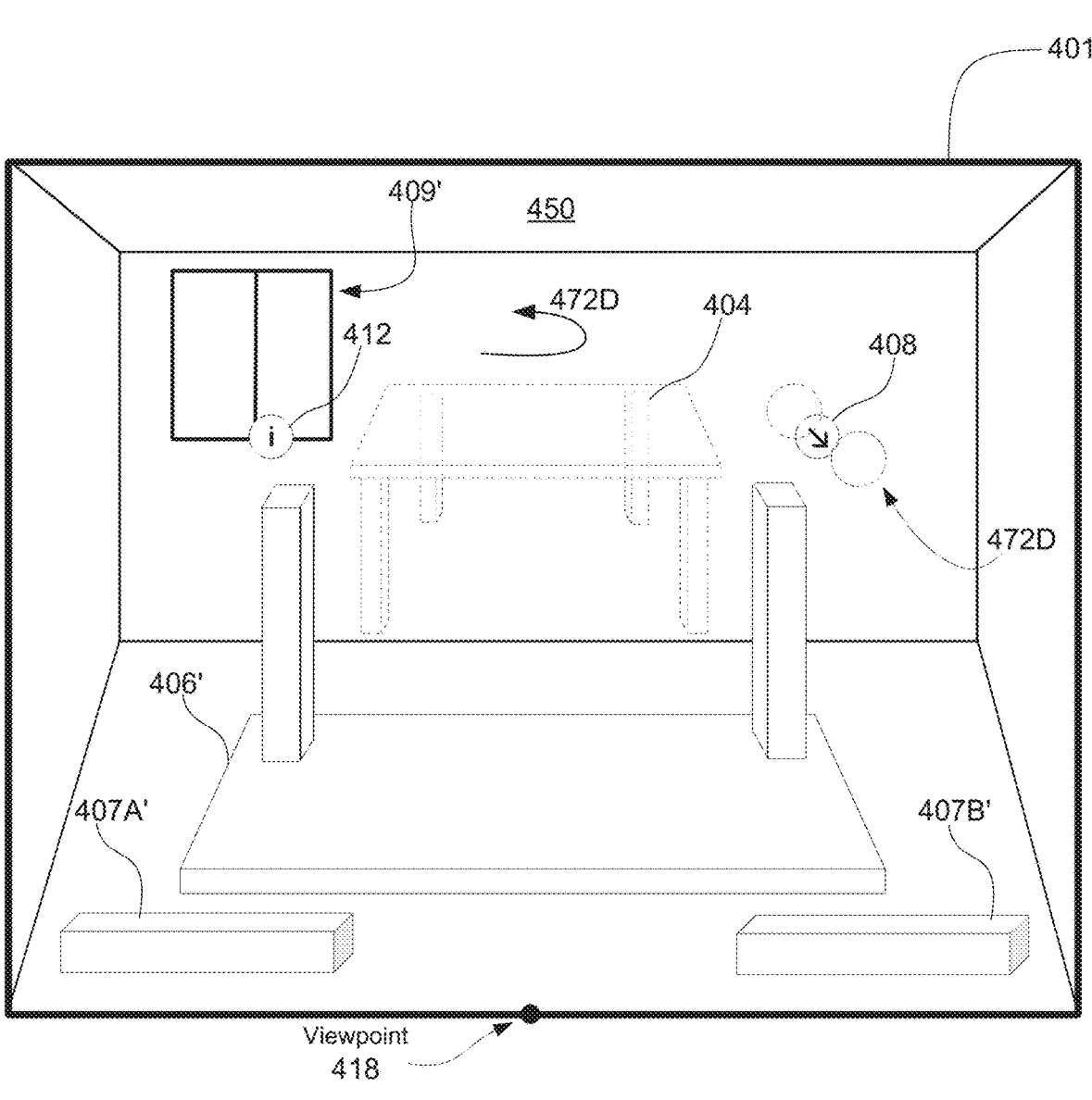

As mentioned above, in some examples, the electronic device 401 transitions from displaying the virtual object 404 in the maximized state to displaying the virtual object in the minimized state in the three-dimensional environment 450 in response to detecting an event that satisfies the one or more criteria. In some examples, the event may alternatively correspond to a selection of a respective option of the one or more selectable options displayed with the virtual object 404 in the three-dimensional environment 450. For example, as shown in FIG. 4D, while the virtual object 404 is displayed in the maximized state and in the tilt locked/world locked orientation in the three-dimensional environment 450, the electronic device 401 receives (e.g., via one or more input devices in communication with the electronic device 401) a selection input 472D directed to the first option 408 in the three-dimensional environment 450. In some examples, the selection input 472D corresponds to an air pinch gesture (e.g., in which an index finger and thumb of a hand of the user come together to make contact), a tap or touch gesture, a gaze dwell, a verbal command, or other direct or indirect input directed to the first option 408.

In some examples, the one or more criteria include a criterion that is satisfied if the selection input 472D is directed to a particular option of the one or more selectable options displayed with the virtual object 404. As discussed previously above, in FIG. 4D, the virtual object 404 is displayed with the first option 408 and the second option 412 in the three-dimensional environment 450. As mentioned previously above, in some examples, the first option 408 is selectable to cause the electronic device 401 to display the virtual object 404 in the minimized state in the three-dimensional environment 450. Accordingly, because the selection input 472D described above is directed to the first option 408, and not the second option 412, for example, the electronic device 401 determines that the one or more criteria are satisfied.

Figure 4E:
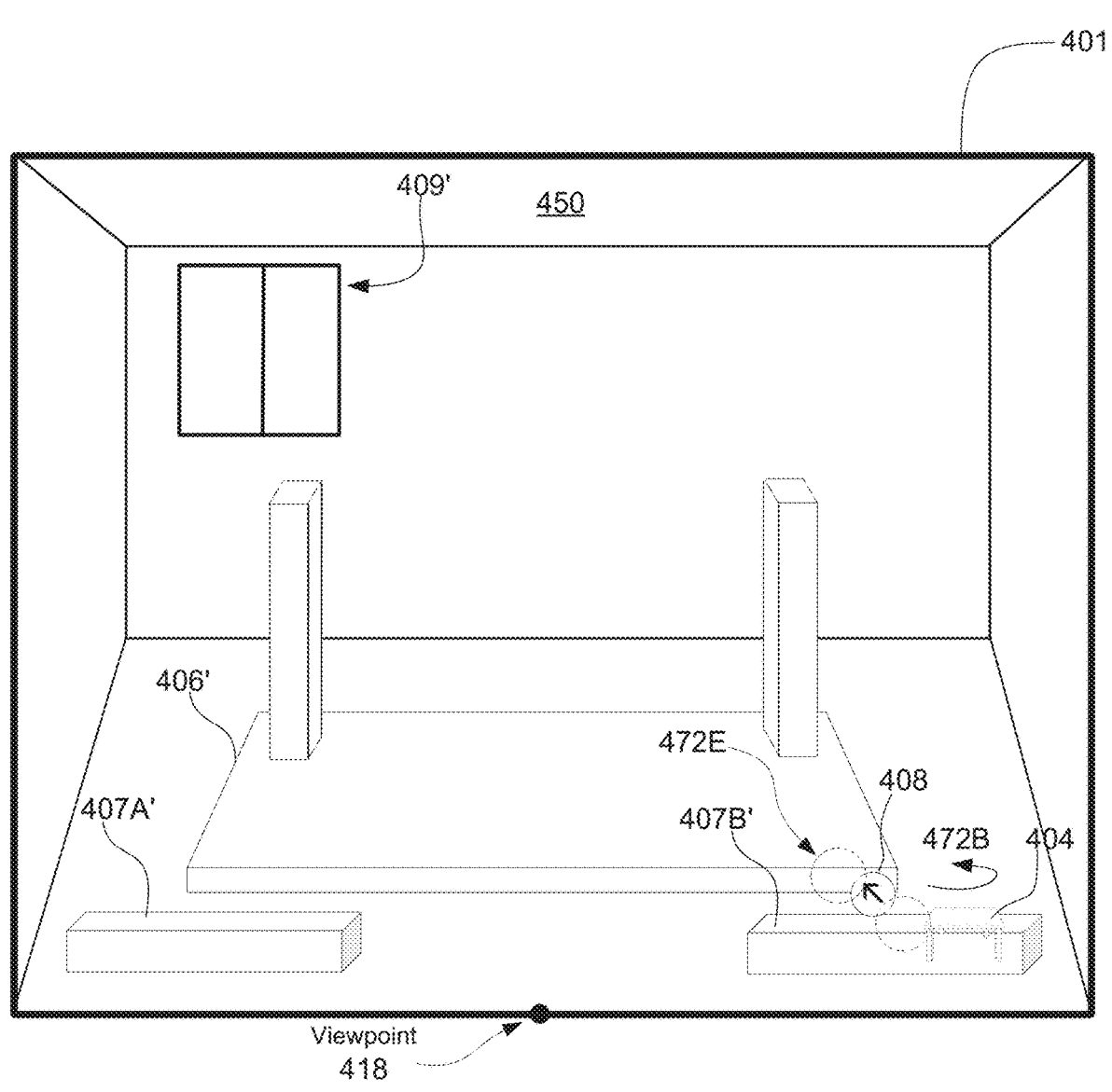

In some examples, as shown in FIG. 4E, in response to receiving the selection input 472D and in accordance with the determination that the one or more criteria are satisfied as discussed above, the electronic device 401 displays the virtual object 404 in the minimized state in the three-dimensional environment 450. For example, as shown in FIG. 4E and as similarly discussed above, the electronic device displays the virtual object 404 at a second size that is smaller than the first size of the virtual object in FIG. 4D, and displays the virtual object 404 at a corner (e.g., the bottom right corner) of the field of view of the user in the three-dimensional environment 450 rather than in the center of the field of view as shown in FIG. 4D. Additionally, as similarly discussed above, the electronic device 401 transitions from displaying the virtual object 404 in tilt locked/ world locked to displaying the virtual object 404 in head locked in the three-dimensional environment 450. For example, in FIG. 4E, while in the minimized state, the virtual object 404 is displayed relative to the user's head in the three-dimensional environment 450 from the viewpoint 418 of the user, as previously discussed herein.

Additionally, as shown in FIG. 4E, the electronic device 401 updates display of the one or more selectable options when the virtual object 404 is displayed in the three-dimensional environment 450. For example, as shown in FIG. 4E, the electronic device 401 displays the first option 408 with the virtual object 404 in corner of the field of view of the user in the three-dimensional environment 450. In some examples, as similarly discussed above, the electronic device 401 updates the functionality associated with the first option 408 when the virtual object 404 is displayed in the minimized state in the three-dimensional environment 450. For example, in FIG. 4E, the first option 408 is now selectable to cause the electronic device 401 to redisplay the virtual object 404 in the maximized state in the three-dimensional environment 450. Additionally, as shown in FIG. 4E and as previously discussed above, while the virtual object 404 is displayed in the minimized state in the three-dimensional environment 450, the electronic device 401 continues to rotate the virtual object 404 (e.g., in the yaw direction) about a vertical axis through the virtual object 404 from the viewpoint 418 of the user.

Figure 4F:
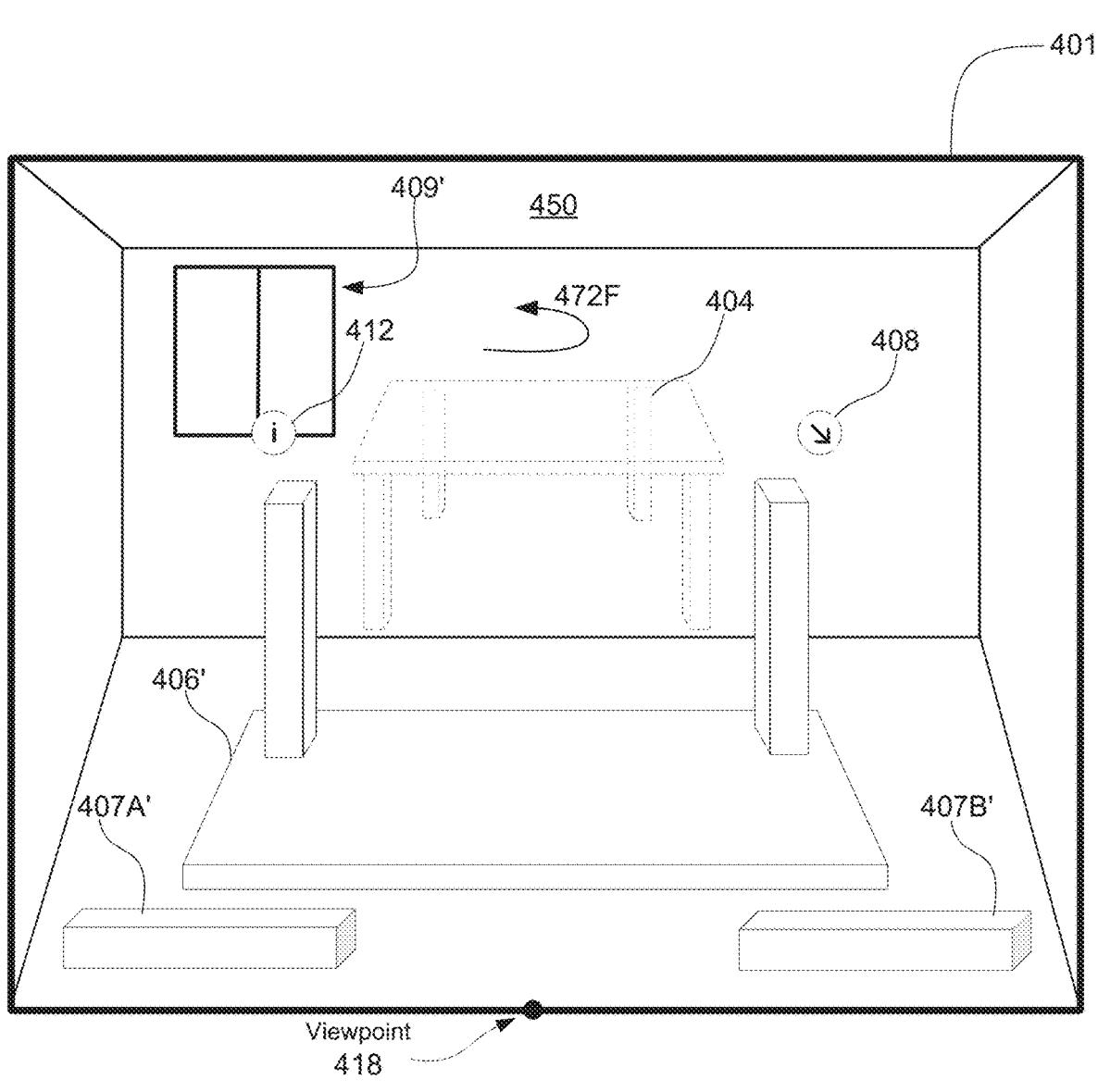

In FIG. 4E, while the virtual object 404 is displayed in the minimized state in the three-dimensional environment 450, the electronic device 401 receives selection input 472E directed to the first option 408 (e.g., a second event). For example, the electronic device 401 detects an air pinch gesture, a tap or touch gesture, a gaze dwell, a verbal command, or other direct or indirect input directed to the first option 408 in the three-dimensional environment 450. In some examples, in response to receiving the selection input 472E, the electronic device 401 redisplays the virtual object 404 in the maximized state in the three-dimensional environment 450, as shown in FIG. 4F. Additionally, as previously discussed herein, the electronic device 401 transitions from displaying the virtual object 404 in the head locked orientation to displaying the virtual object 404 in the tilt locked/world locked orientation in the three-dimensional environment 450. As shown in FIG. 4F, the electronic device 401 displays the one or more selectable options with the virtual object 404 in the center of the field of view of the user in the three-dimensional environment 450. Additionally, in FIG. 4F, the electronic device 401 updates the functionality associated with the first option 408, such that the first option 408 is selectable to cause the virtual object 404 to be displayed in the minimized state in the three-dimensional environment 450.

Figure 4G:
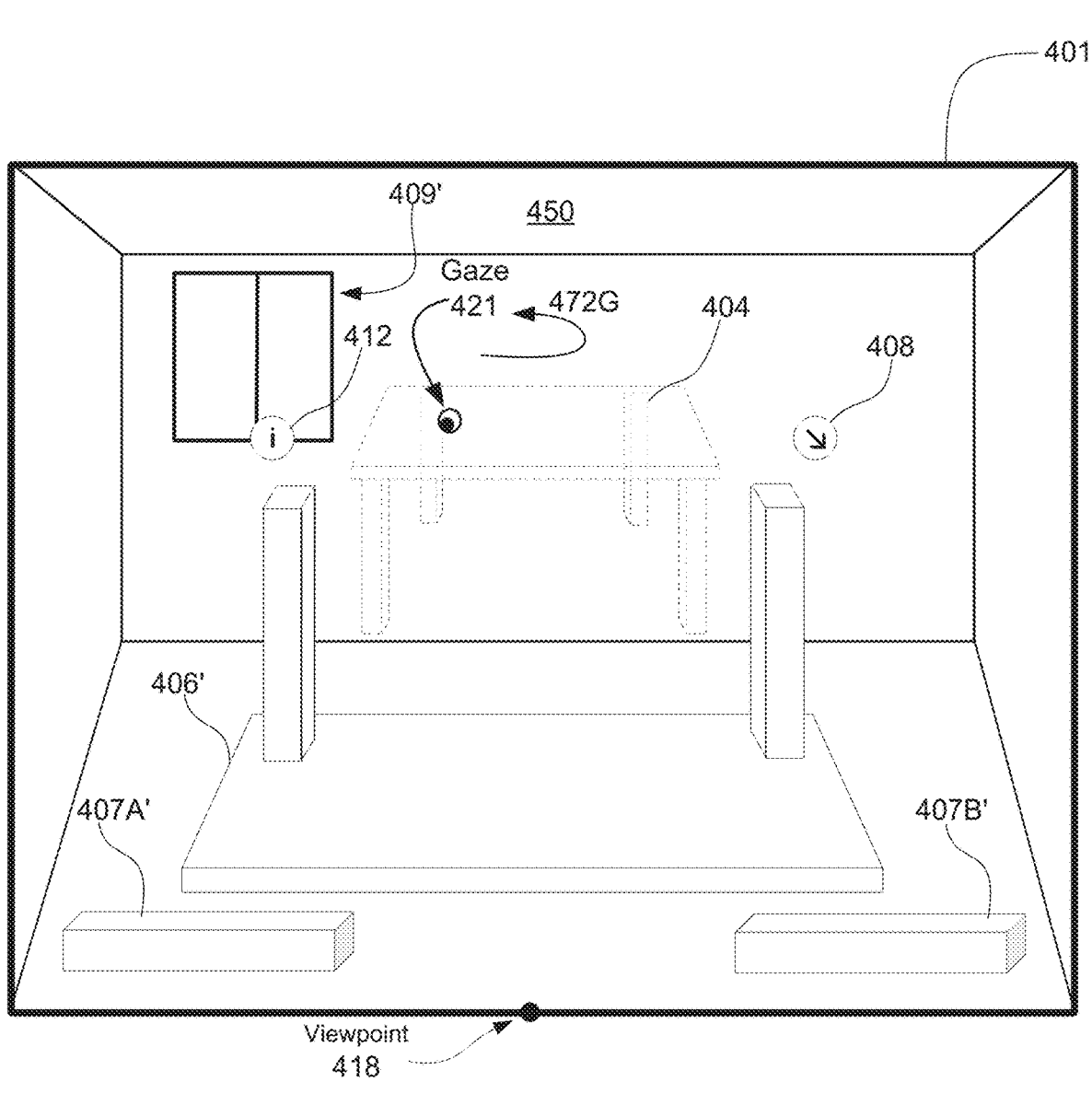

As discussed herein, in some examples, the electronic device 401 transitions from displaying the virtual object 404 in the maximized state to displaying the virtual object in the minimized state in the three-dimensional environment 450 in response to detecting an event that satisfies the one or more criteria. In some examples, the event may alternatively include movement of a gaze of the user in the three-dimensional environment 450 (e.g., independent of movement of the viewpoint of the user). For example, as shown in FIG. 4G, the gaze 421 of the user may be directed to a portion of the virtual object 404 in the three-dimensional environment 450 (e.g., or in a direction of the virtual object 404 in the three-dimensional environment 450, such as the back wall of the physical environment in the field of view of the user). In some examples, while the gaze 421 of the user is directed toward the virtual object 404 while the virtual object 404 is displayed in the maximized state, as shown in FIG. 4G, the electronic device 401 maintains display of the virtual object 404 in the maximized state. For example, if the electronic device 401 detects movement of the gaze 421 toward a different portion of the virtual object 404, such as a leg of the virtual object 404 in FIG. 4G, the electronic device 401 may maintain display of the virtual object 404 in the maximized state in the three-dimensional environment 450.

Figure 4H:
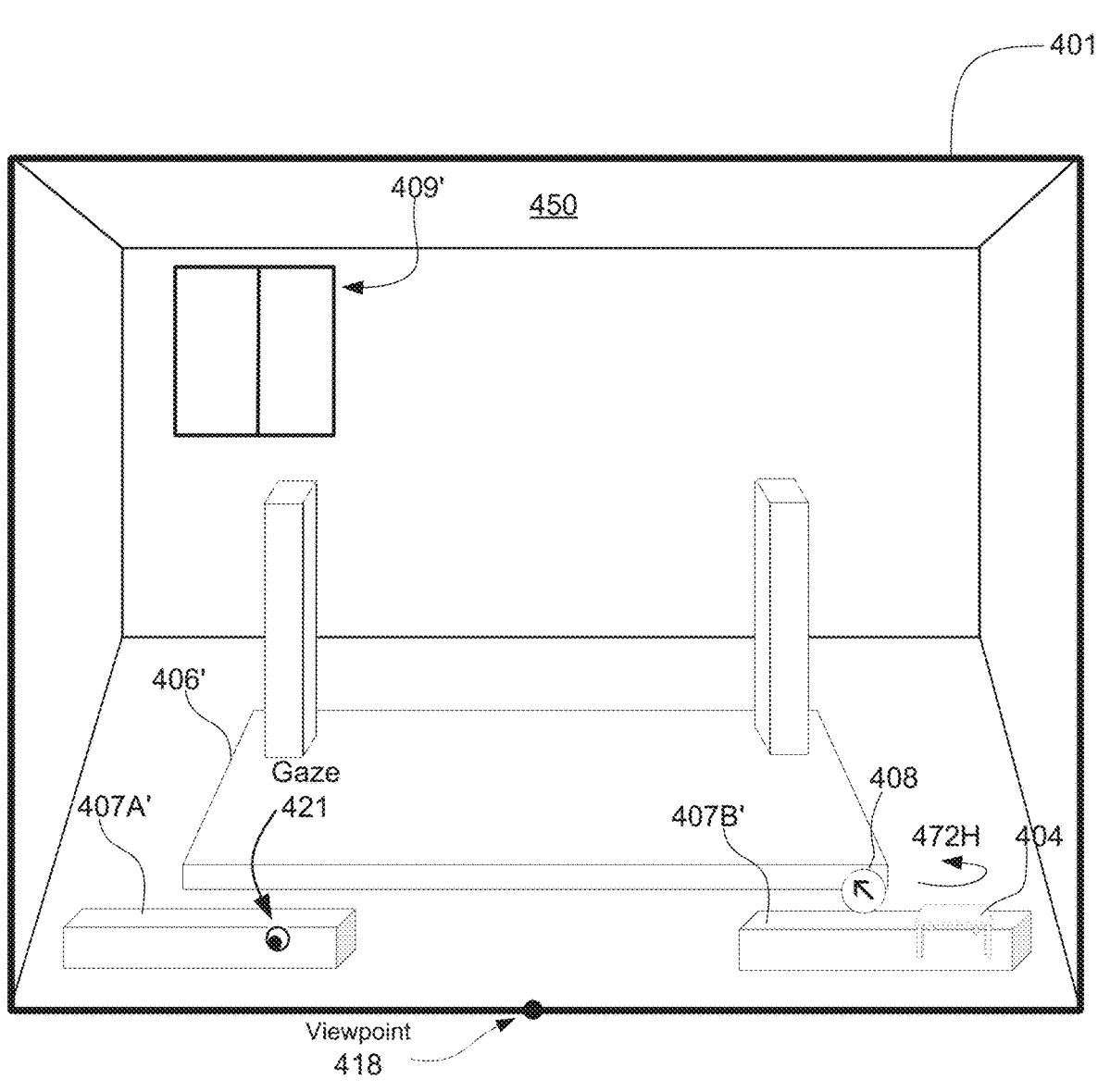

From FIGS. 4G-4H, the electronic device 401 optionally detects movement of the gaze 421 of the user in the three-dimensional environment 450. For example, the electronic device 401 detects (e.g., via the eye tracking sensor(s) 212 in FIG. 2) the eye(s) of the user move away from the virtual object 404 in the three-dimensional environment 450. In some examples, the one or more criteria include a criterion that is satisfied if the gaze 421 of the user is directed to a particular location in the three-dimensional environment 450 after the movement of the gaze 421. For example, the criterion is satisfied if the gaze 421 of the user is directed toward another object in the three-dimensional environment 450, such as a physical object in the field of view of the user or another virtual object in the three-dimensional environment 450. In some such examples, the movement of the gaze 421 to the physical object or another virtual object in the three-dimensional environment 450 is interpreted by the electronic device 401 as intention by the user to interact with (e.g., directly or indirectly) the physical object or the virtual object, in which case display of the virtual object 404 in the maximized state may be undesirable. As shown in FIG. 4H, the gaze 421 of the user has moved from the virtual object 404 in FIG. 4G to the representation of the first leg 407A' in the three-dimensional environment 450.

In FIG. 4H, because the gaze 421 of the user is directed to the representation of the first leg 407A' in the three-dimensional environment 450, which corresponds to the first leg in the physical environment surrounding the electronic device 401, the electronic device 401 determines that the one or more criteria are satisfied. Accordingly, as shown in FIG. 4H, the electronic device 401 displays the virtual object in the minimized state in the three-dimensional environment 450 and displays the virtual object in the head locked orientation from the viewpoint 418 of the user. As shown in FIG. 4G, because the user input did not include movement of the viewpoint 418 of the user (e.g., movement of the electronic device 401), the electronic device 401 forgoes updating presentation of the portions of the three-dimensional environment 450 surrounding the virtual object 404

(e.g., the representation of the table 406' and the representation of the window 409'). Additionally, as similarly discussed above, the electronic device 401 continues to rotate the virtual object 404 about a vertical axis through the virtual object 404 while displaying the virtual object 404 in the minimized state in the three-dimensional environment 450.

In some examples, if the gaze 421 of the user returns to the location of FIG. 4G (e.g., a second event), the electronic device 401 optionally redisplays the virtual object 404 in the maximized state in the three-dimensional environment 450 (as similarly shown in FIG. 4G). Alternatively, in some examples, if the gaze 421 of the user moves from the representation of the first leg 407A' to the virtual object 404 while the virtual object 404 is displayed in the minimized state in FIG. 4H (e.g., without moving the viewpoint 418), the electronic device 401 may redisplay the virtual object 404 in the maximized state in the three-dimensional environment 450 (as similarly shown in FIG. 4G). In some examples, if the gaze 421 of the user moves from the representation of the first leg 407A' to another physical object in the three-dimensional environment 450, such as the representation of the table 406' or the representation of the second leg 407B', the electronic device 401 maintains display of the virtual object 404 in the minimized state in the three-dimensional environment 450 (as similarly shown in FIG. 4H).

In some examples, the event that causes the electronic device 401 to transition from displaying the virtual object 404 in the maximized state to displaying the virtual object 404 in the minimized state in the three-dimensional environment 450 may alternatively include initiation of countdown of a timer associated with the display of the virtual object 404 in the three-dimensional environment 450. For example, as previously discussed herein, the virtual object 404 may be associated with an application (e.g., a furniture assembly application) running on the electronic device 401. In some examples, the electronic device 401 may display the virtual object 404 in a given visual state (e.g., maximized state or minimized state) for a threshold amount of time (e.g., 1, 5, 10, 15, 30, 60, 120, 180, etc. seconds) based on display data received from the application.

Figure 4I:
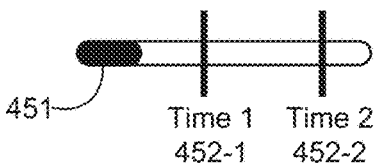

In FIG. 4I, the electronic device 401 is displaying the virtual object 404 in the maximized state in the three-dimensional environment 450. In some examples, the threshold amount of time discussed above may be associated with a timer, indicated by time marker 452-1 ("Time 1") in timeline 451. In some examples, the electronic device 401 displays the virtual object 404 in the maximized state and in the tilt locked/world locked orientation in the three-dimensional environment 450 for the threshold amount of time (e.g., until the timer elapses (e.g., counts up to the threshold amount of time or counts down to zero from the threshold amount of time)) represented by the time marker 452-1 in FIG. 4I. In some examples, the electronic device 401 evaluates (e.g., measures) the threshold amount of time from when the virtual object 404 was last displayed in a given visual state in the three-dimensional environment 450. For example, in FIG. 4I, the electronic device 401 initiates elapsing of the timer once the electronic device 401 displays the virtual object 404 in the maximized state in the three-dimensional environment 450.

In some examples, the electronic device 401 displays the virtual object 404 in the maximized state in the three-dimensional environment 450 for the threshold amount of time irrespective of other events detected by the electronic device 401. For example, in FIG. 4I, the electronic device 401 maintains display of the virtual object 404 in the maximized state in the three-dimensional environment 450 until the timer associated with the threshold amount of time elapses independent of whether the electronic device 401 detects another event during the elapsing of the timer that satisfies the one or more criteria discussed previously, such as movement of the viewpoint 418 of the user and/or movement of the gaze of the user. Alternatively, in some examples, if the electronic device 401 detects an event that satisfies the one or more criteria described previously above while the timer is elapsing, the electronic device 401 transitions to displaying the virtual object 404 in the minimized state in the three-dimensional environment 450 even though the threshold amount of time has not fully elapsed. For example, if the electronic device 401 detects movement of the viewpoint 418 of the user beyond the threshold movement or selection of the first option 408 in the three-dimensional environment 450, as previously discussed, the electronic device 401 displays the virtual object 404 in the minimized state in the three-dimensional environment 450 irrespective of whether the timer has fully elapsed. In some examples, if the electronic device 401 detects an event that does not satisfy the one or more criteria described above while the timer is elapsing, the electronic device 401 maintains display of the virtual object 404 in the maximized state in the three-dimensional environment 450 and optionally resets the elapsing of the timer.

In some examples, the one or more criteria for causing the virtual object 404 to be displayed in the minimized state in the three-dimensional environment 450 include a criterion that is satisfied if the threshold amount of time discussed above elapses since displaying the virtual object 404 in the maximized state in the three-dimensional environment 450. As shown in FIG. 4I, while the virtual object 404 is displayed in the maximized state in the three-dimensional environment 450, the electronic device 401 is elapsing the timer associated with the threshold amount of time, represented by the time marker 452-1 in the timeline 451. As mentioned above, the electronic device 401 measures the threshold amount of time relative to when the virtual object 404 was displayed in the maximized state in the three-dimensional environment 450 in FIG. 4I. As shown in FIG. 4I, because the threshold amount of time has not elapsed in the timeline 451, the electronic device 401 determines that the one or more criteria are not satisfied and thus maintains display of the virtual object 404 in the maximized state in the three-dimensional environment 450.

Figure 4J:
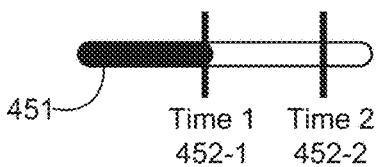

In FIG. 4J, the electronic device 401 determines that the threshold amount of time, represented by the time marker 452-1 in the timeline 451, has elapsed since displaying the virtual object 404 in the maximized state in the three-dimensional environment 450. In some examples, as mentioned previously above, the one or more criteria are satisfied in accordance with a determination that the threshold amount of time has elapsed (e.g., without detecting user input, which may pause or reset the elapsing of the timer), as illustrated in FIG. 4J. In some examples, as shown in FIG. 4J, in accordance with the determination that the threshold amount of time discussed above has elapsed, the electronic device 401 displays the virtual object 404 in the minimized state in the three-dimensional environment 450. Additionally, as described herein, the electronic device 401 displays the virtual object 404 in the head locked orientation in the three-dimensional environment 450 from the viewpoint 418 of the user.

In some examples, while displaying the virtual object 404 in the minimized state in the three-dimensional environment 450, the electronic device 401 redisplays the virtual object 404 in the maximized state in the three-dimensional environment 450 in accordance with a determination that a threshold amount of time (e.g., such as the threshold amount of time discussed above) has elapsed since displaying the virtual object 404 in the minimized state. For example, as shown in FIG. 4J, the timeline 451 includes a second time marker 452-2 ("Time 2") that follows the first time marker 452-1 (e.g., is chronologically located after the first time marker 452-1 in the timeline 451). As described previously above, in some examples, the threshold amount of time for displaying the virtual object 404 in the minimized state in the three-dimensional environment 450 is determined based on display data received from the application (e.g., the furniture assembly application) running on the electronic device 401. In some examples, the electronic device 401 initiates elapsing of the timer associated with the threshold amount of time when the electronic device 401 displays the virtual object 404 in the minimized state in the three-dimensional environment 450.

Figure 4K:
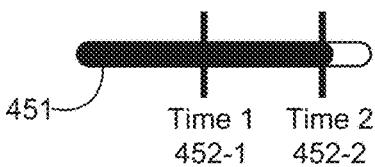

In some examples, as shown in FIG. 4K, in accordance with a determination that the threshold amount of time has elapsed since displaying the virtual object 404 in the minimized state in the three-dimensional environment 450, the electronic device 401 redisplays the virtual object 404 in the maximized state in the three-dimensional environment 450. For example, in FIG. 4K, the electronic device 401 redisplays the virtual object 404 in the maximized state in the three-dimensional environment 450 after the timer associated with the threshold amount of time ends, as illustrated in the timeline 451. Additionally, as discussed herein, the electronic device 401 redisplays the virtual object 404 in the tilt locked/world locked orientation in the three-dimensional environment 450 from the viewpoint 418 of the user.

In some examples, the electronic device 401 redisplays the virtual object 404 in the maximized state in the three-dimensional environment 450 in response to detecting a direct interaction with one or more physical objects in the user's field of view in the three-dimensional environment 450. For example, in FIG. 4J, while the virtual object 404 is displayed in the minimized state in the three-dimensional environment 450, the electronic device 401 alternatively detects user interaction with the representation of the second leg 407B' in the three-dimensional environment 450 (e.g., irrespective of or instead of the elapsing of the timer discussed above). In some examples, the user interaction may include picking up and attaching the second leg (visible in the three-dimensional environment 450 as the representation 407B') to the bottom surface of the tabletop of the table (visible in the three-dimensional environment 450 as the representation 406'), as shown in FIG. 4K. In some examples, in response to detecting the user interaction (e.g., that the representation of the second leg 407B' has been attached to the representation of the table 406'), as shown in FIG. 4K, the electronic device 401 redisplays the virtual object 404 in the maximized state in the three-dimensional environment 450. For example, when the user attaches the second leg to the table in the physical environment, the electronic device 401 determines that the user has advanced a step in assembling the table in the physical environment. Accordingly, the electronic device 401 may display the virtual object 404 in the maximized state in the three-dimensional environment 450 as shown in FIG. 4K to provide the user with a visual cue (e.g., an animation or visual instruction) for the next step in assembling the table.

In some examples, the event that causes the electronic device 401 to transition from displaying the virtual object 404 in the maximized state in the three-dimensional environment 450 to displaying the virtual object 404 in the minimized state may correspond to an external trigger. In some examples, the external trigger may include detecting the presence of another user. For example, while displaying the three-dimensional environment 450 that includes the virtual object 404 in the maximized state, the electronic device 401 may detect external audio, such as a voice of another user (e.g., who may or may not be in the user's field of view). As another example, the electronic device 401 may detect the other user in the user's field of view in the three-dimensional environment (e.g., because the other user walked into the user's field of view). In some such examples, the electronic device 401 may minimize the display of the virtual object 404 in the manner described herein to enable the user to seamlessly interact with (e.g., view, talk to, etc.) the other user in the physical environment surrounding the electronic device 401.

Accordingly, as discussed above, the user may continuously view and/or interact with the physical objects in the three-dimensional environment 450, such as the representation of the table 406' including the representations of the first leg 407A' and the second leg 407B', and the electronic device 401 may automatically transition between displaying the virtual object 404 in the maximized state (and in the tilt locked/world locked orientation) and displaying the virtual object 404 in the minimized state (and in the head locked orientation) based on whether one or more criteria are satisfied. Thus, as described herein with reference to FIGS. 4A-4K, the disclosed method enables a user to, while a virtual object is displayed in a three-dimensional environment, continuously view and/or interact with the physical objects in the three-dimensional environment, while concurrently maintaining display of the virtual object, irrespective of a direction of a viewpoint and/or a gaze of the user, as one advantage. Additionally, the disclosed method enables the virtual object to continuously be displayed in the three-dimensional environment for reference when viewing and/or interacting with the physical objects in the three-dimensional environment, which would otherwise hinder and/or delay the user's ability to perform a particular action directed to the physical objects (e.g., assembling a physical object, as discussed herein). The disclosed method may also reduce power usage at the electronic device because the virtual object is no longer displayed maximized in the center of the user's field of view, as an additional advantage.

It should be understood that, in some examples, the above description of the one or more user selectable options being moved with the virtual object 404 in the three-dimensional environment 450 follows any suitable motion curve. For example, the first selectable option 408 and the second selectable option 412 may be moved concurrently (e.g., in real time) with the virtual object 404 in the three-dimensional environment 450 when the virtual object 404 is transitioned between being displayed in the maximized state and the minimized state in the three-dimensional environment 450. Alternatively, in some examples, the first selectable option 408 and the second selectable option 412 may "lazy follow" the virtual object 404 when the virtual object 404 is moved in the three-dimensional environment 450 when transitioning between displaying the virtual object 404 between the maximized state and the minimized state. For example, the one or more selectable options follow a spring-based motion relationship with the virtual object 404, such that when the virtual object 404 is moved in the three-dimensional environment 450, the one or more selectable options do not move until the virtual object 404 "pulls" the one or more selectable options into motion according to the spring-based motion relationship.

Additionally it should be understood that the events described with reference to FIGS. 4A-4K need not occur separately. For example, the electronic device 401 may detect movement of the viewpoint 418 of the user and may concurrently detect movement of the gaze 421 of the user in the three-dimensional environment 450. In such an example, if one or both of these actions causes the one or more criteria discussed herein to be satisfied (e.g., because the movement of the viewpoint 418 exceeds the threshold movement or the movement of the gaze 421 causes the gaze 421 to be directed to a physical object in the three-dimensional environment 450, as described previously), the electronic device 401 may transition from displaying the virtual object 404 in the maximized state to displaying the virtual object 404 in the minimized state in the three-dimensional environment 450 (or vice versa) in the manner described above.

It is understood that the examples shown and described herein are merely exemplary and that additional and/or alternative elements may be provided within the three-dimensional environment for interacting with the virtual objects and selectable options. It should be understood that the appearance, shape, form, and size of each of the various selectable options and virtual objects shown and described herein are exemplary and that alternative appearances, shapes, forms and/or sizes may be provided. For example, the virtual object representative of a physical object in the three-dimensional environment (e.g., virtual object 404) may alternatively represent a different physical object in the three-dimensional environment (e.g., such as a virtual rendering or model of the window 409). In some examples, the various selectable options (e.g., first and second selectable options 408 and 412) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

FIG. 5 illustrates a flow diagram illustrating an example process for minimizing display of an object from tilt locked (or head locked) or world orientation to head locked orientation in a three-dimensional environment according to some examples of the disclosure. In some examples, process 500 begins at an electronic device in communication with a display and one or more input devices. In some examples, the electronic device is optionally a head-mounted display similar or corresponding to device 201 of FIG. 2. As shown in FIG. 5, in some examples, at 502, the electronic device presents, via the display, a computer-generated environment including a first object, wherein the first object is displayed in a first manner in the computer-generated environment relative to a viewpoint of a user of the electronic device. For example, the electronic device (e.g., electronic device 401 in FIG. 4A) displays a three-dimensional environment, such as three-dimensional environment 450, that includes a virtual object displayed in a tilt locked (or head locked) or world locked orientation in the three-dimensional environment, such as virtual object 404 displayed in a maximized state in FIG. 4A.

In some examples, at 504, while presenting the computer-generated environment including the first object that is displayed in the first manner, the electronic device detects that a first event has occurred. For example, the electronic device detects radial movement of the viewpoint of the user downward in the pitch direction relative to the three-dimensional environment, such as the downward movement of the viewpoint 418 represented by arrow 471A in FIG. 4A. In some examples, the electronic device detects movement of a gaze of the user, such as the movement of the gaze 421 in FIG. 4G. In some examples, the electronic device detects a selection of a respective selectable option in the three-dimensional environment, such as the selection input 472D in FIG. 4D. In some examples, the electronic device detects initiation of a countdown of a timer associated with the display of the virtual object in the first manner, such as the initiation of the elapsing of the timer associated with threshold amount of time represented by time marker 452-1 in timeline 451 in FIG. 4I.

In some examples, at 506, in response to detecting that the first event has occurred, at 508, in accordance with a determination that the first event satisfies one or more criteria, the electronic device displays, via the display, the first object in a second manner, different from the first manner, in the computer-generated environment relative to the viewpoint of the user. For example, as shown in FIG. 4B, the electronic device 401 transitions from displaying the virtual object 404 in the maximized state to displaying the virtual object 404 in a minimized state in the three-dimensional environment 450. Additionally, in some examples, the electronic device displays the virtual object in a head locked orientation in the three-dimensional environment, as similarly discussed above with reference to FIG. 4B.

In some examples, at 510, in accordance with a determination that the first event does not satisfy the one or more criteria, the electronic device maintains display of the first object in the first manner in the computer-generated environment relative to the viewpoint of the user. For example, as similarly shown in FIG. 4C, the electronic device 401 maintains display of the virtual object 404 in the maximized state and in the tilt locked (or head locked) or world locked orientation in the three-dimensional environment 450 from the viewpoint 418 of the user. In some examples, the satisfaction of the one or more criteria is based on the first event detected by the electronic device. For example, if the first event includes movement of the viewpoint of the user, the one or more criteria are satisfied if the movement of the viewpoint exceeds a threshold movement (e.g., an angular threshold relative to a reference ray intersecting the horizon of the field of view of the user, as similarly illustrated in legend 415 in FIG. 4B). In some examples, if the first event includes selection of a respective selectable option in the three-dimensional environment, the one or more criteria are satisfied if the selection is directed to a first option in the three-dimensional environment (e.g., such as first selectable option 408 as shown in FIG. 4D). In some examples, if the first event includes movement of the gaze of the user, the one or more criteria are satisfied if the gaze is direction to a physical object in the three-dimensional environment (e.g., such as the gaze 421 directed to the representation of the first leg 407A' as shown in FIG. 4H). In some examples, if the first event includes initiating countdown of the timer associated with the display of the virtual object in the three-dimensional environment, the one or more criteria are satisfied if the countdown of the timer ends.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising, at an electronic device in communication with a display and one or more input devices: presenting, via the display, a computer-generated environment including a first object, wherein the first object is displayed in a first manner in the computer-generated environment relative to a viewpoint of a user of the electronic device; while presenting the computer-generated environment including the first object that is displayed in the first manner, detecting that a first event has occurred; and in response to detecting that the first event has occurred, in accordance with a determination that the first event satisfies one or more criteria, displaying, via the display, the first object in a second manner, different from the first manner, in the computer-generated environment relative to the viewpoint of the user, and in accordance with a determination that the first event does not satisfy the one or more criteria, maintaining display of the first object in the first manner in the computer-generated environment relative to the viewpoint of the user.

Additionally or alternatively, in some examples, the electronic device includes a head-mounted display. Additionally or alternatively, in some examples, the first object is a three-dimensional representation of a physical object in a physical environment. Additionally or alternatively, in some examples, the physical object in the physical environment is visible in a field of view of the user. Additionally or alternatively, in some examples, displaying the first object in the first manner in the computer-generated environment includes displaying the first object at a first location in the computer-generated environment relative to a first predefined portion of the user according to a first coordinate system. Additionally or alternatively, in some examples, displaying the first object in the second manner in the computer-generated environment includes displaying the first object at a second location in the computer-generated environment relative to a second predefined portion, different from the first predefined portion, of the user according to a second coordinate system, different from the first coordinate system. Additionally or alternatively, in some examples, displaying the first object in the first manner in the computer-generated environment includes displaying the first object at a first location in the computer-generated environment relative to the computer-generated environment. Additionally or alternatively, in some examples, detecting that the first event has occurred includes detecting movement of the viewpoint of the user relative to the computer-generated environment. Additionally or alternatively, in some examples, the one or more criteria include a criterion that is satisfied when the movement of the viewpoint of the user exceeds a threshold movement.

Additionally or alternatively, in some examples, the determination that the movement of the viewpoint of the user exceeds the threshold movement is in accordance with a determination that a vertical component of the movement of the viewpoint of the user exceeds a threshold angle relative to a reference. Additionally or alternatively, in some examples, detecting that the first event has occurred includes initiating countdown of a timer associated with the display of the first object in the first manner in the computer-generated environment. Additionally or alternatively, in some examples, the one or more criteria include a criterion that is satisfied when the countdown reaches an end of the timer. Additionally or alternatively, in some examples, detecting that the first event has occurred includes detecting movement of a gaze of the user in the computer-generated environment. Additionally or alternatively, in some examples, the one or more criteria include a criterion that is satisfied when, after the movement of the gaze of the user, the gaze of the user is directed to a target other than the first object in the computer-generated environment. Additionally or alternatively, in some examples, the target includes a second object. Additionally or alternatively, in some examples, the first object is displayed with one or more selectable options in the computer-generated environment, and detecting that the first event has occurred includes receiving, via the one or more input devices, a selection of a respective option of the one or more selectable options.

Additionally or alternatively, in some examples, the one or more criteria include a criterion that is satisfied when the respective option is a first option. Additionally or alternatively, in some examples, displaying the first object in the first manner in the computer-generated environment includes displaying the first object at a location in the computer-generated environment that is at a center of a field of view of the user. Additionally or alternatively, in some examples, displaying the first object in the second manner in the computer-generated environment includes displaying the first object at a location in the computer-generated environment that is outside a center of a field of view of the user. Additionally or alternatively, in some examples, displaying the first object in the first manner in the computer-generated environment includes displaying the first object at a first size in the computer-generated environment. Additionally or alternatively, in some examples, displaying the first object in the second manner in the computer-generated environment includes displaying the first object at a second size, smaller than the first size, in the computer-generated environment. Additionally or alternatively, in some examples, the method further comprises: while displaying the first object in the second manner in the computer-generated environment in accordance with the determination that the first event satisfies the one or more criteria in response to detecting that the first event has occurred, detecting that a second event has occurred; and in response to detecting that the second event has occurred and in accordance with a determination that the second event satisfies one or more second criteria, redisplaying, via the display, the first object in the first manner in the computer-generated environment relative to the viewpoint of the user.

Additionally or alternatively, in some examples, detecting that the first event has occurred includes detecting movement of the viewpoint of the user from a first viewpoint to a second viewpoint that exceeds a threshold movement, and the one or more second criteria include a criterion that is satisfied when detecting that the second event has occurred includes detecting movement of the viewpoint of the user back to the first viewpoint. Additionally or alternatively, in some examples, the first object is displayed with a plurality of selectable options in the computer-generated environment, detecting that the first event has occurred includes receiving, via the one or more input devices, a selection of a first option of the plurality of selectable options, and the one or more second criteria include a criterion that is satisfied when detecting that the second event has occurred includes receiving a selection of a second option of the plurality of selectable options. Additionally or alternatively, in some examples, detecting that the first event has occurred includes determining that a countdown of a timer associated with the display of the first object in the first manner in the computer-generated environment has ended, and the one or more second criteria include a criterion that is satisfied when detecting that the second event has occurred includes determining that a countdown of a timer associated with the display of the first object in the second manner in the computer-generated environment has ended. Additionally or alternatively, in some examples, detecting that the first event has occurred includes detecting movement of a gaze of the user from the first object to a second object in the computer-generated environment, and the one or more second criteria include a criterion that is satisfied when detecting that the second event has occurred includes detecting movement of the gaze of the user back to the first object in the computer-generated environment.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device in communication with a display and one or more input devices:

presenting, via the display, a three-dimensional environment including a first object, wherein the first object is displayed in a first manner in the three-dimensional environment relative to a viewpoint of a user of the electronic device, including displaying the first object at a first location in the three-dimensional environment that is at a center of a field of view of the user;

while presenting the three-dimensional environment including the first object that is displayed in the first manner, detecting that a first event has occurred, including rotation of the viewpoint of the user relative to the three-dimensional environment; and in response to detecting that the first event has occurred:

in accordance with a determination that the first event satisfies one or more criteria, including a criterion that is satisfied when a vertical component of the rotation of the viewpoint of the user exceeds a threshold angle relative to a reference, displaying, via the display, the first object in a second manner, different from the first manner, in the three-dimensional environment relative to the viewpoint of the user, including displaying the first object at a second location, different from the first location, in the three-dimensional environment that is outside the center of the field of view of the user; and in accordance with a determination that the first event does not satisfy the one or more criteria, maintaining display of the first object in the first manner in the three-dimensional environment relative to the viewpoint of the user.

2. The method of claim 1, wherein:

displaying the first object in the first manner in the three-dimensional environment includes displaying the first object at a first location in the three-dimensional environment relative to a first predefined portion of the user according to a first coordinate system; and displaying the first object in the second manner in the three-dimensional environment includes displaying the first object at a second location in the three-dimensional environment relative to a second predefined portion, different from the first predefined portion, of the user according to a second coordinate system, different from the first coordinate system.

3. The method of claim 1, wherein:

detecting that the first event has occurred includes detecting movement of the viewpoint of the user relative to the three-dimensional environment; and the one or more criteria include a criterion that is satisfied when the movement of the viewpoint of the user exceeds a threshold movement.

4. The method of claim 1, wherein:

detecting that the first event has occurred includes initiating countdown of a timer associated with the display of the first object in the first manner in the three-dimensional environment; and the one or more criteria include a criterion that is satisfied when the countdown reaches an end of the timer.

5. The method of claim 1, wherein:

detecting that the first event has occurred includes detecting movement of a gaze of the user in the three-dimensional environment; and the one or more criteria include a criterion that is satisfied when, after the movement of the gaze of the user, the gaze of the user is directed to a target other than the first object in the three-dimensional environment.

6. The method of claim 1, further comprising:

while displaying the first object in the second manner in the three-dimensional environment in accordance with the determination that the first event satisfies the one or more criteria in response to detecting that the first event has occurred, detecting that a second event has occurred; and in response to detecting that the second event has occurred and in accordance with a determination that the second event satisfies one or more second criteria, redisplaying, via the display, the first object in the first manner in the three-dimensional environment relative to the viewpoint of the user.

7. The method of claim 6, wherein:

detecting that the first event has occurred includes detecting movement of the viewpoint of the user from a first viewpoint to a second viewpoint that exceeds a threshold movement; and the one or more second criteria include a criterion that is satisfied when detecting that the second event has occurred includes detecting movement of the viewpoint of the user back to the first viewpoint.

8. The method of claim 6, wherein:

the first object is displayed with a plurality of selectable options in the three-dimensional environment;

detecting that the first event has occurred includes receiving, via the one or more input devices, a selection of a first option of the plurality of selectable options; and the one or more second criteria include a criterion that is satisfied when detecting that the second event has occurred includes receiving a selection of a second option of the plurality of selectable options.

9. The method of claim 1, wherein:

displaying the first object in the first manner in the three-dimensional environment includes displaying the first object with a first locked orientation in the three-dimensional environment; and displaying the first object in the second manner in the three-dimensional environment includes displaying the first object with a second locked orientation, different from the first locked orientation, in the three-dimensional environment.

10. An electronic device comprising:

one or more processors;

memory; and one or more programs stored in the memory and configured to be executed by the one or more processors, the one or more programs including instructions for performing a method comprising:

presenting, via a display, a three-dimensional environment including a first object, wherein the first object is displayed in a first manner in the three-dimensional environment relative to a viewpoint of a user of the electronic device, including displaying the first object at a first location in the three-dimensional environment that is at a center of a field of view of the user;

while presenting the three-dimensional environment including the first object that is displayed in the first manner, detecting that a first event has occurred, including rotation of the viewpoint of the user relative to the three-dimensional environment; and in response to detecting that the first event has occurred:

in accordance with a determination that the first event satisfies one or more criteria, including a criterion that is satisfied when a vertical component of the rotation of the viewpoint of the user exceeds a threshold angle relative to a reference, displaying, via the display, the first object in a second manner, different from the first manner, in the three-dimensional environment relative to the viewpoint of the user, including displaying the first object at a second location, different from the first location, in the three-dimensional environment that is outside the center of the field of view of the user; and in accordance with a determination that the first event does not satisfy the one or more criteria, maintaining display of the first object in the first manner in the three-dimensional environment relative to the viewpoint of the user.

11. The electronic device of claim 10, wherein:

displaying the first object in the first manner in the three-dimensional environment includes displaying the first object at a first location in the three-dimensional environment relative to a first predefined portion of the user according to a first coordinate system; and displaying the first object in the second manner in the three-dimensional environment includes displaying the first object at a second location in the three-dimensional environment relative to a second predefined portion, different from the first predefined portion, of the user according to a second coordinate system, different from the first coordinate system.

12. The electronic device of claim 10, wherein:

detecting that the first event has occurred includes detecting movement of the viewpoint of the user relative to the three-dimensional environment; and the one or more criteria include a criterion that is satisfied when the movement of the viewpoint of the user exceeds a threshold movement.

13. The electronic device of claim 10, wherein:

detecting that the first event has occurred includes initiating countdown of a timer associated with the display of the first object in the first manner in the three-dimensional environment; and the one or more criteria include a criterion that is satisfied when the countdown reaches an end of the timer.

14. The electronic device of claim 10, wherein:

detecting that the first event has occurred includes detecting movement of a gaze of the user in the three-dimensional environment; and the one or more criteria include a criterion that is satisfied when, after the movement of the gaze of the user, the gaze of the user is directed to a target other than the first object in the three-dimensional environment.

15. The electronic device of claim 10, wherein the method further comprises:

while displaying the first object in the second manner in the three-dimensional environment in accordance with the determination that the first event satisfies the one or more criteria in response to detecting that the first event has occurred, detecting that a second event has occurred; and in response to detecting that the second event has occurred and in accordance with a determination that the second event satisfies one or more second criteria, redisplaying, via the display, the first object in the first manner in the three-dimensional environment relative to the viewpoint of the user.

16. The electronic device of claim 15, wherein:

detecting that the first event has occurred includes detecting movement of the viewpoint of the user from a first viewpoint to a second viewpoint that exceeds a threshold movement; and the one or more second criteria include a criterion that is satisfied when detecting that the second event has occurred includes detecting movement of the viewpoint of the user back to the first viewpoint.

17. The electronic device of claim 15, wherein:

the first object is displayed with a plurality of selectable options in the three-dimensional environment;

detecting that the first event has occurred includes receiving, via one or more input devices, a selection of a first option of the plurality of selectable options; and the one or more second criteria include a criterion that is satisfied when detecting that the second event has occurred includes receiving a selection of a second option of the plurality of selectable options.

18. The electronic device of claim 10, wherein:

displaying the first object in the first manner in the three-dimensional environment includes displaying the first object with a first locked orientation in the three-dimensional environment; and displaying the first object in the second manner in the three-dimensional environment includes displaying the first object with a second locked orientation, different from the first locked orientation, in the three-dimensional environment.

19. A non-transitory computer readable storage medium storing one or more programs, the one or more programs comprising instructions, which when executed by one or more processors of an electronic device, cause the electronic device to perform a method comprising:

presenting, via a display, a three-dimensional environment including a first object, wherein the first object is displayed in a first manner in the three-dimensional environment relative to a viewpoint of a user of the electronic device, including displaying the first object at a first location in the three-dimensional environment that is at a center of a field of view of the user;

while presenting the three-dimensional environment including the first object that is displayed in the first manner, detecting that a first event has occurred, including rotation of the viewpoint of the user relative to the three-dimensional environment; and in response to detecting that the first event has occurred:

in accordance with a determination that the first event satisfies one or more criteria, including a criterion that is satisfied when a vertical component of the rotation of the viewpoint of the user exceeds a threshold angle relative to a reference, displaying, via the display, the first object in a second manner, different from the first manner, in the three-dimensional environment relative to the viewpoint of the user, including displaying the first object at a second location, different from the first location, in the three-dimensional environment that is outside the center of the field of view of the user; and in accordance with a determination that the first event does not satisfy the one or more criteria, maintaining display of the first object in the first manner in the three-dimensional environment relative to the viewpoint of the user.

20. The non-transitory computer readable storage medium of claim 19, wherein:

displaying the first object in the first manner in the three-dimensional environment includes displaying the first object at a first location in the three-dimensional environment relative to a first predefined portion of the user according to a first coordinate system; and displaying the first object in the second manner in the three-dimensional environment includes displaying the first object at a second location in the three-dimensional environment relative to a second predefined portion, different from the first predefined portion, of the user according to a second coordinate system, different from the first coordinate system.

21. The non-transitory computer readable storage medium of claim 19, wherein:

detecting that the first event has occurred includes detecting movement of the viewpoint of the user relative to the three-dimensional environment; and the one or more criteria include a criterion that is satisfied when the movement of the viewpoint of the user exceeds a threshold movement.

22. The non-transitory computer readable storage medium of claim 19, wherein:

detecting that the first event has occurred includes initiating countdown of a timer associated with the display of the first object in the first manner in the three-dimensional environment; and the one or more criteria include a criterion that is satisfied when the countdown reaches an end of the timer.

23. The non-transitory computer readable storage medium of claim 19, wherein:

detecting that the first event has occurred includes detecting movement of a gaze of the user in the three-dimensional environment; and the one or more criteria include a criterion that is satisfied when, after the movement of the gaze of the user, the gaze of the user is directed to a target other than the first object in the three-dimensional environment.

24. The non-transitory computer readable storage medium of claim 19, wherein the method further comprises:

while displaying the first object in the second manner in the three-dimensional environment in accordance with the determination that the first event satisfies the one or more criteria in response to detecting that the first event has occurred, detecting that a second event has occurred; and in response to detecting that the second event has occurred and in accordance with a determination that the second event satisfies one or more second criteria, redisplaying, via the display, the first object in the first manner in the three-dimensional environment relative to the viewpoint of the user.

25. The non-transitory computer readable storage medium of claim 24, wherein:

detecting that the first event has occurred includes detecting movement of the viewpoint of the user from a first viewpoint to a second viewpoint that exceeds a threshold movement; and the one or more second criteria include a criterion that is satisfied when detecting that the second event has occurred includes detecting movement of the viewpoint of the user back to the first viewpoint.

26. The non-transitory computer readable storage medium of claim 24, wherein:

the first object is displayed with a plurality of selectable options in the three-dimensional environment;

detecting that the first event has occurred includes receiving, via one or more input devices, a selection of a first option of the plurality of selectable options; and the one or more second criteria include a criterion that is satisfied when detecting that the second event has occurred includes receiving a selection of a second option of the plurality of selectable options.

27. The non-transitory computer readable storage medium of claim 19, wherein:

displaying the first object in the first manner in the three-dimensional environment includes displaying the first object with a first locked orientation in the three-dimensional environment; and displaying the first object in the second manner in the three-dimensional environment includes displaying the first object with a second locked orientation, different from the first locked orientation, in the three-dimensional environment.

* * * * *